(12) United States Patent
Hasegawa et al.

(10) Patent No.: US 10,741,328 B2
(45) Date of Patent: Aug. 11, 2020

(54) MULTI-LAYER CERAMIC ELECTRONIC COMPONENT

(71) Applicant: Taiyo Yuden Co., Ltd., Tokyo (JP)

(72) Inventors: Hiroyuki Hasegawa, Tokyo (JP); Takashi Ogawa, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 3 days.

(21) Appl. No.: 16/270,156

(22) Filed: Feb. 7, 2019

(65) Prior Publication Data

US 2019/0252119 A1   Aug. 15, 2019

(30) Foreign Application Priority Data

Feb. 9, 2018   (JP) .................................. 2018-021880
Sep. 26, 2018  (JP) .................................. 2018-180245

(51) Int. Cl.
| | | |
|---|---|---|
| *H01G 4/012* | (2006.01) | |
| *H01G 4/30* | (2006.01) | |
| H01G 4/12 | (2006.01) | |
| H01G 4/008 | (2006.01) | |

(52) U.S. Cl.
CPC ............. *H01G 4/012* (2013.01); *H01G 4/30* (2013.01); *H01G 4/008* (2013.01); *H01G 4/12* (2013.01)

(58) Field of Classification Search
CPC ......... H01G 4/005; H01G 4/012; H01G 4/008
See application file for complete search history.

(56) References Cited

U.S. PATENT DOCUMENTS

| 691,598 A | 1/1902 | Christopherson | |
|---|---|---|---|
| 5,040,093 A * | 8/1991 | Greuel ................... | H01G 4/012 29/25.42 |
| 2006/0139848 A1* | 6/2006 | Kim ....................... | H01G 4/012 361/306.3 |
| 2013/0141837 A1* | 6/2013 | Lee ........................ | H01G 4/012 361/321.2 |

FOREIGN PATENT DOCUMENTS

| JP | 05-226178 A | | 9/1993 | |
|---|---|---|---|---|
| JP | 06045181 A | * | 2/1994 | |
| JP | 10-275736 A | | 10/1998 | |
| JP | 2012099786 A | * | 5/2012 | ............... H01G 4/30 |

* cited by examiner

*Primary Examiner* — Eric W Thomas
(74) *Attorney, Agent, or Firm* — Saliwanchik, Lloyd & Eisenschenk

(57) ABSTRACT

A multi-layer ceramic electronic component includes: first internal electrodes each including a first main electrode and a first drawn portion extending from the first main electrode to a first end surface facing in a first direction; and second internal electrodes each including a second main electrode and a second drawn portion extending from the second main electrode to a second end surface facing the first end surface in the first direction, the first and second internal electrodes being alternately laminated, the first drawn portion having a width dimension along a second direction that decreases toward the first end surface and having a predetermined width dimension in the first end surface, the second direction being orthogonal to the first direction, the second drawn portion having a width dimension along the second direction that increases toward the second end surface and having the predetermined width dimension in the second end surface.

15 Claims, 22 Drawing Sheets

MULTI-LAYER CERAMIC ELECTRONIC COMPONENT

CROSS-REFERENCE TO RELATED APPLICATIONS

This application claims the benefit under 35 U.S.C. § 119 of Japanese Patent Application Nos. 2018-021880, filed Feb. 9, 2018; and 2018-180245, filed Sep. 26, 2018; all of which are hereby incorporated by reference in their entirety.

BACKGROUND

The present disclosure relates to a multi-layer ceramic electronic component such as a multi-layer ceramic capacitor.

Typically, a multi-layer ceramic capacitor is produced as follows. First, unsintered ceramic green sheets on which a plurality of internal electrode patterns are respectively formed are laminated. Subsequently, the laminate of the ceramic green sheets is cut at predetermined positions, and an unsintered ceramic body in which side margins and end margins are formed in the periphery of the internal electrodes is produced. The ceramic body is sintered, and external electrodes are formed on the surface of the ceramic body, so that a multi-layer ceramic capacitor is produced.

In the production processes described above, the deviation of lamination at the time of lamination of the ceramic green sheets or the deviation of cut positions at the time of cutting may occur. The occurrence of such deviation causes the positions of the internal electrodes to be deviated from design positions and makes it difficult to sufficiently ensure insulation properties and environment resistance of the internal electrodes.

There is known a method of determining the lamination accuracy of ceramic green sheets or determining the correctness of a cut position in a laminate on the basis of the shapes of the internal electrodes exposed at the surface of the ceramic body.

For example, Japanese Patent Application Laid-open No. Hei 10-275736 discloses a method of producing a laminate substrate on which an internal electrode pattern including a partial blank is formed, and determining the correctness of a lamination position of the laminate substrate on the basis of the presence/absence of a non-exposed portion corresponding to the partial blank of the internal electrode on an end surface of the laminate.

Further, Japanese Patent Application Laid-open No. Hei 5-226178 discloses a multi-layer ceramic capacitor in which a marker for confirming a laminated state is formed in a side margin between an internal electrode and the side surface of a chip, in which the lamination accuracy is confirmed depending on a state where the marker is exposed at an end surface at which the internal electrodes are exposed.

SUMMARY

In recent years, along with demands for miniaturization of multi-layer ceramic electronic components, there is a demand for control of in-plane positions of internal electrodes with high accuracy. However, the method disclosed in Japanese Patent Application Laid-open No. Hei 10-275736 is only for determining the correctness of a lamination position of a laminated board and has had a difficulty in improving the position accuracy of the internal electrodes. Further, the method disclosed in Japanese Patent Application Laid-open No. Hei 5-226178, in which the marker for confirming a laminated state is formed in a side margin, has had a difficulty in accurately detecting the amount of deviation because the dimension of the marker is reduced along with the miniaturization of the multi-layer ceramic electronic component.

In view of the circumstances as described above, it is desirable to provide a method of producing a multi-layer ceramic electronic component and a multi-layer ceramic electronic component, which are capable of accurately detecting the amount of deviation of internal electrodes from design positions.

According to an embodiment of the present disclosure, there is provided a method of producing a multi-layer ceramic electronic component, the method including: forming, on an unsintered ceramic sheet, a plurality of internal electrode patterns each including a first main electrode and a second main electrode that face each other in a first direction, and a narrow width portion that connects the first main electrode and the second main electrode to each other and has a width dimension in a second direction that changes along the first direction, the second direction being orthogonal to the first direction, the plurality of internal electrode patterns being arrayed along the first direction and the second direction; producing a multi-layer sheet by laminating the unsintered ceramic sheets on each of which the plurality of internal electrode patterns are formed; cutting the multi-layer sheet along the first direction and the second direction, to produce a unsintered ceramic body having a first cut surface facing in the first direction and a second cut surface facing in the second direction, a drawn portion obtained by cutting a tapered portion being exposed at the first cut surface, the unsintered ceramic body including an internal electrode including one of the first main electrode and the second main electrode and the drawn portion that are laminated; detecting an amount of deviation in the first direction and the second direction from a design position of the internal electrode on the basis of a first width dimension of the drawn portion along the second direction, and a second width dimension along the second direction from an end portion of the drawn portion in the second direction to the second cut surface, the first width dimension and the second width dimension being obtained by performing a visual inspection on the first cut surface; and sintering the unsintered ceramic body when it is determined that the amount of deviation falls within a predetermined range.

In this configuration, since the internal electrode pattern includes a narrow width portion whose width dimension changes, the width dimension of the drawn portion along the second direction, the drawn portion being exposed from the first cut surface, changes depending on the cut position. Accordingly, the length direction of the drawn portion along the first direction is defined on the basis of the width dimension of the drawn portion.

In other words, when the first cut surface is subjected to a visual inspection, it is possible to calculate not only the width dimension of a side margin along the second direction but also the length dimension of an end margin along the first direction. Additionally, it is possible to quantitatively detect the deviation of the internal electrode from a design position on the basis of the calculated width dimension of the side margin and the calculated length dimension of the end margin.

Therefore, detailed feedback on a cut position in the cutting step and a lamination position in the lamination step can be performed on the basis of the detected amount of deviation, and the position accuracy of the internal electrode can be enhanced. Moreover, the amount of deviation of the internal electrode can be accurately detected by only performing a visual inspection on the first cut surface, which can significantly reduce cost and time for the inspection.

Specifically, the narrow width portion may have a width dimension along the second direction that gradually decreases from the first main electrode toward the second main electrode.

With this configuration, the width dimension of the drawn portion exposed from the first cut surface has one-to-one correspondence with a distance from the main electrode in the first direction. In other words, it is possible to determine not only the amount of deviation of the internal electrode but also the orientation of the deviation. Therefore, more proper feedback can be performed on the cut position and the lamination position, and the position accuracy of the internal electrode can further be enhanced.

Further, the narrow width portion may include a constricted portion that has a smallest width dimension along the second direction between the first main electrode and the second main electrode.

With such a configuration as well, it is possible to quantitatively detect the deviation of the internal electrode.

For example, the constricted portion is configured such that a first outer edge and a second outer edge that face each other in the second direction extend in the first direction across a design cutting line extending in the second direction.

The narrow width portion may further include a first connection portion and a second connection portion. The first connection portion connects the constricted portion and the first main electrode to each other, and a portion thereof on the first outer edge side protrudes from the constricted portion to one side in the Y-axis direction. The second connection portion connects the constricted portion and the second main electrode to each other, and a portion thereof on the second outer edge side protrudes from the constricted portion to another side in the Y-axis direction.

In the configuration described above, the constricted portion is configured to have a substantially constant width dimension, and the first connection portion and the second connection portion are each configured to have a width dimension that is larger than that of the constricted portion and smaller than that of the main electrode. With this configuration, it is possible to determine which position of the narrow width portion is cut on the basis of the width dimension of the drawn portion exposed from the first cut surface. Moreover, since the first connection portion and the second connection portion protrude on the different sides, it is possible to determine to which connection portion side the cut position corresponding to the first cut surface deviates, on the basis of the position deviation of the drawn portion in the second direction on the end surface.

In other words, in the configuration described above, it is possible to determine the amount of deviation of the internal electrode and the orientation of the deviation by performing a visual inspection on one end surface and also provide a region having a constant width dimension in a part of the narrow width portion. This can suppress narrowing of the width dimension of the narrow width portion. With this configuration, even if the multi-layer ceramic capacitor is miniaturized, the position deviation of the internal electrode can be detected easily and accurately.

The narrow width portion may have a shape linearly non-symmetrical with a straight line parallel to the second direction.

With this configuration, the narrow width portion has different shapes on the first main electrode side and the second main electrode side. In other words, it is possible to provide a configuration in which the deviation of the cut position in the narrow width portion is easily detected and to easily determine the orientation of the deviation of the internal electrode along the first direction on the basis of the width dimension of the drawn portion exposed from the first cut surface.

Moreover, at least one of a cut position along the first direction and the second direction in the step of producing the unsintered ceramic body or a lamination position of each ceramic sheet in the step of producing the multi-layer sheet is adjusted on the basis of the amount of deviation, and thus the position of the internal electrode along the first direction and the second direction may be adjusted.

In the configuration described above, it is possible to quantitatively detect the deviation, feedback on the cut position and the lamination position can be performed. With this configuration, the position accuracy of the internal electrode can further be enhanced.

According to another embodiment of the present disclosure, there is provided a multi-layer ceramic electronic component including first internal electrodes and second internal electrodes laminated alternately with the first internal electrodes.

The first internal electrodes each include a first main electrode, and a first drawn portion extending from the first main electrode to a first end surface facing in a first direction.

The second internal electrodes each include a second main electrode, and a second drawn portion extending from the second main electrode to a second end surface facing the first end surface in the first direction.

The first drawn portion is formed to have a width dimension along a second direction that decreases toward the first end surface and to have a predetermined width dimension in the first end surface, the second direction being orthogonal to the first direction.

The second drawn portion is formed to have a width dimension along the second direction that increases toward the second end surface and to have the predetermined width dimension in the second end surface.

In the multi-layer ceramic electronic component having the configuration described above, when at least one of the first end surface or the second end surface is subjected to a visual inspection, it is possible to calculate a width dimension of a side margin along the second direction and a length dimension of an end margin along the first direction. Accordingly, it is possible to quantitatively detect the amount of deviation of the internal electrode from a design position.

Therefore, detailed feedback on a cut position and a lamination position in the production processes can be performed on the basis of the detected amount of deviation, and the position accuracy of the internal electrode can be enhanced. Moreover, the amount of deviation of the internal electrode can be accurately detected by only performing a visual inspection on one surface, which can significantly reduce cost and time for the inspection.

According to another embodiment of the present disclosure, there is provided a multi-layer ceramic electronic component including first internal electrodes and second internal electrodes laminated alternately with the first internal electrodes.

The first internal electrodes each include a first main electrode, and a first drawn portion extending from the first main electrode to a first end surface facing in a first direction.

The second internal electrodes each include a second main electrode, and a second drawn portion extending from the second main electrode to a second end surface facing the first end surface in the first direction.

The first drawn portion includes a constricted portion having a smallest width dimension along the second direction, and a portion having a width dimension that decreases from the first main electrode toward the constricted portion and a portion having a width dimension that increases from the constricted portion toward the first end surface.

The second drawn portion is formed to have a width dimension along the second direction that decreases toward the second end surface and to have the same width dimension in the second end surface as a width dimension of the first drawn portion in the first end surface.

According to another embodiment of the present disclosure, there is provided a multi-layer ceramic electronic component including first internal electrodes and second internal electrodes laminated alternately with the first internal electrodes.

The first internal electrodes each include a first main electrode, and a first drawn portion extending from the first main electrode to a first end surface facing in a first direction.

The second internal electrodes each include a second main electrode, and a second drawn portion extending from the second main electrode to a second end surface facing the first end surface in the first direction.

The first drawn portion is formed to have a width dimension along a second direction that increases on one side in the second direction toward the first main electrode and to have a predetermined width dimension in the first end surface, the second direction being orthogonal to the first direction.

The second drawn portion is formed to have a width dimension along the second direction that increases on another side in the second direction toward the second end surface and to have the predetermined width dimension in the second end surface.

In the multi-layer ceramic electronic component having the configuration described above, when at least one of the first end surface or the second end surface is subjected to a visual inspection, it is possible to determine whether a width dimension of a side margin along the second direction and a length dimension of an end margin along the first direction are proper or not or determine a direction to be corrected. Accordingly, it is possible to easily detect the amount of deviation of the internal electrode from a design position.

Therefore, feedback on a cut position and a lamination position in the production processes can be facilitated on the basis of the detected amount of deviation, and the position accuracy of the internal electrode can be enhanced. Moreover, the amount of deviation of the internal electrode can be accurately detected by only performing a visual inspection on one surface, which can significantly reduce cost and time for the inspection.

For example, the multi-layer ceramic electronic component may have an outer dimension in the first direction of 0.6 mm as a design value, and an outer dimension in the second direction of 0.3 mm as a design value.

Moreover, the multi-layer ceramic electronic component may have an outer dimension in the first direction of 0.4 mm as a design value, and an outer dimension in the second direction of 0.2 mm as a design value.

Further, the multi-layer ceramic electronic component may have an outer dimension in the first direction of 0.2 mm as a design value, and an outer dimension in the second direction of 0.1 mm as a design value.

Further, the multi-layer ceramic electronic component may have an outer dimension in a third direction that is less than 0.3 mm, the third direction being orthogonal to the first direction and the second direction.

As described above, according to the present disclosure, it is possible to provide a method of producing a multi-layer ceramic electronic component and a multi-layer ceramic electronic component, which are capable of accurately detecting the amount of deviation of internal electrodes from design positions.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, embodiments of the present disclosure will be described with reference to the drawings.

I First Embodiment

1. Basic Configuration of Multi-Layer Ceramic Capacitor 10

Figure 1:
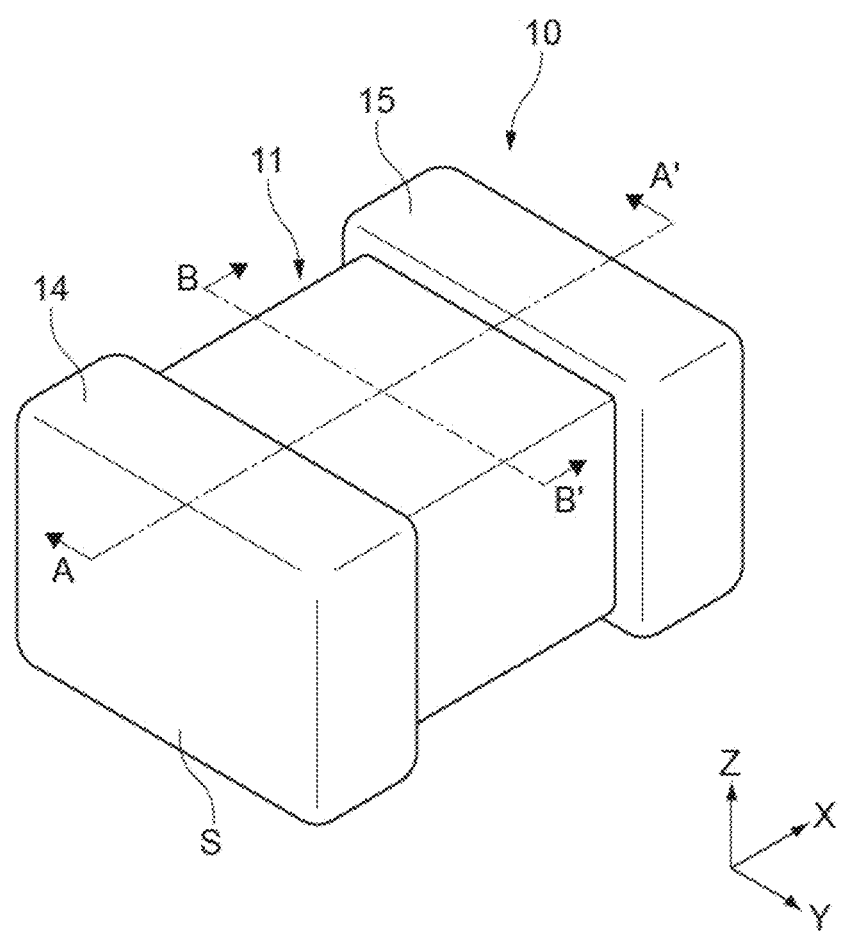
FIG. 1 is a perspective view of a multi-layer ceramic capacitor according to a first embodiment of the present disclosure.
Figure 2:
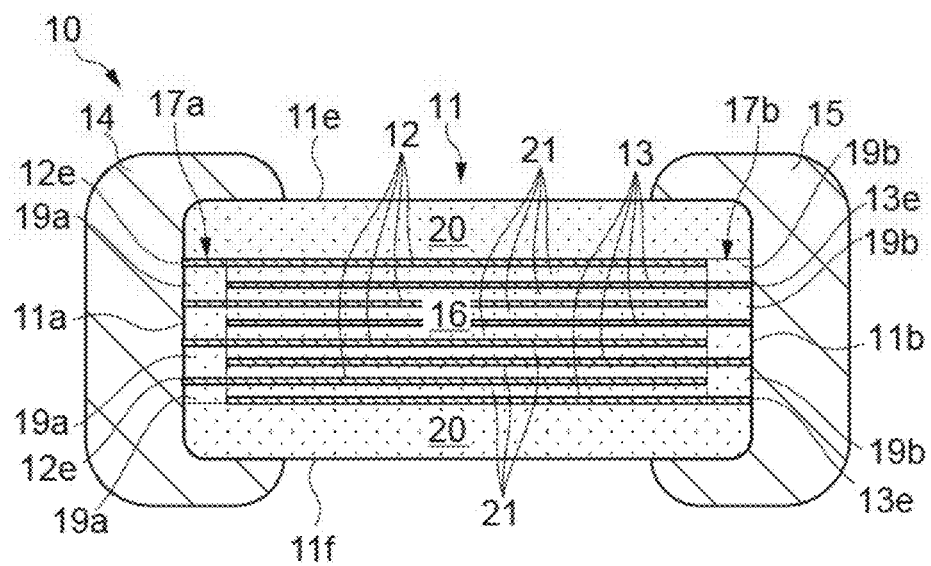
FIG. 2 is a cross-sectional view of the multi-layer ceramic capacitor taken along the A-A' line in FIG. 1.
Figure 3:
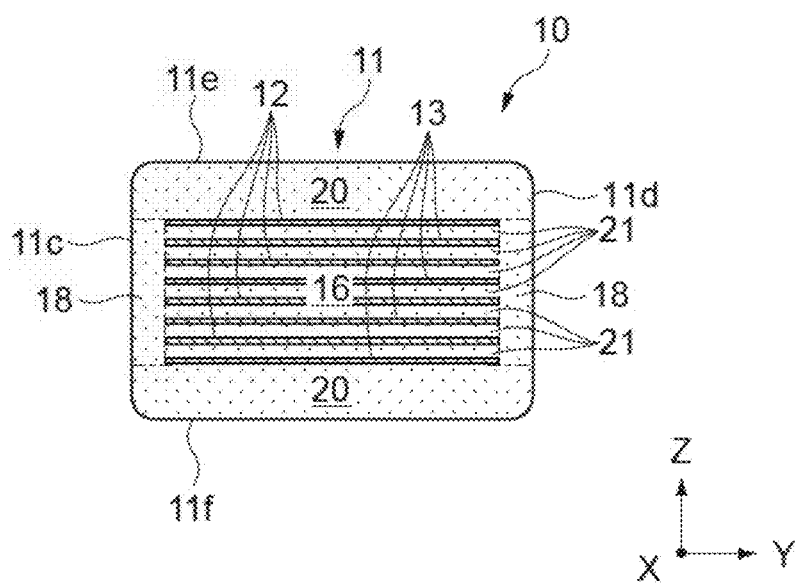
FIG. 3 is a cross-sectional view of the multi-layer ceramic capacitor taken along the B-B' line in FIG. 1.

FIGS. 1 to 3 each show a multi-layer ceramic capacitor 10 according to a first embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The multi-layer ceramic capacitor 10 has a structure in which the first external electrode 14 and the second external electrode 15 are formed on the surface of the ceramic body 11.

The ceramic body 11 has two end surfaces 11a and 11b facing in the X-axis direction, two side surfaces 11c and 11d facing in the Y-axis direction, and two main surfaces 11e and 11f facing in the Z-axis direction. The first external electrode 14 and the second external electrode 15 are formed on the end surfaces 11a and 11b, respectively. Ridges connecting the respective surfaces of the ceramic body 11 may be chamfered.

The ceramic body 11 includes first internal electrodes 12 and second internal electrodes 13 that are formed therein. The first internal electrodes 12 and the second internal electrodes 13 are alternately laminated in the Z-axis direction while sandwiching ceramic layers 21 therebetween.

Figure 4:
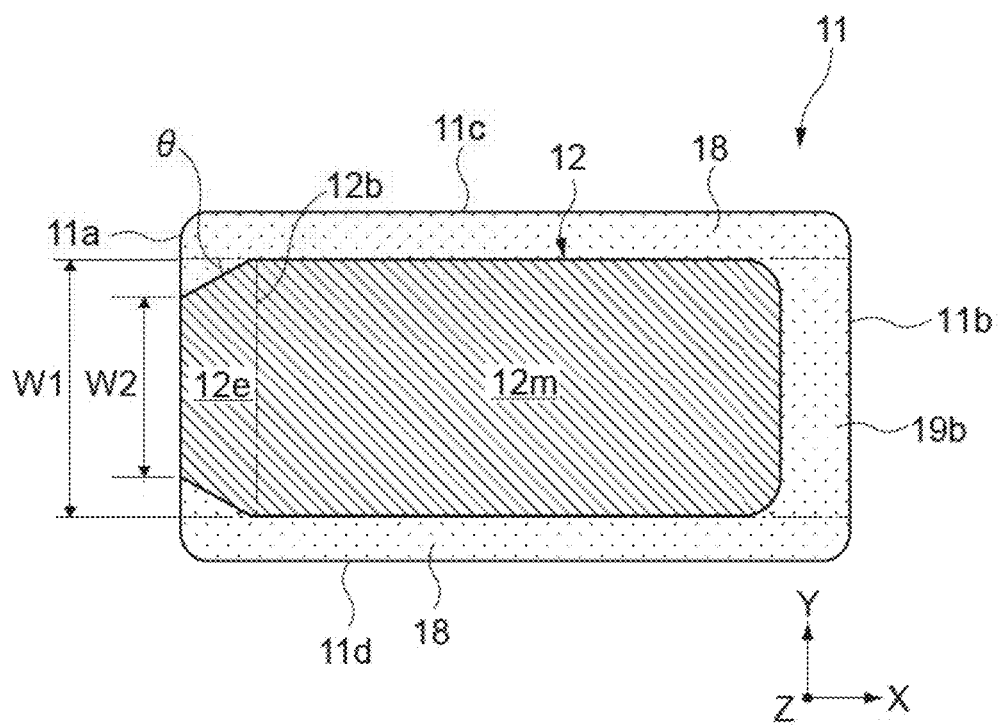
FIG. 4 is a cross-sectional view of a ceramic body of the multi-layer ceramic capacitor taken along the X-Y plane.
Figure 5:
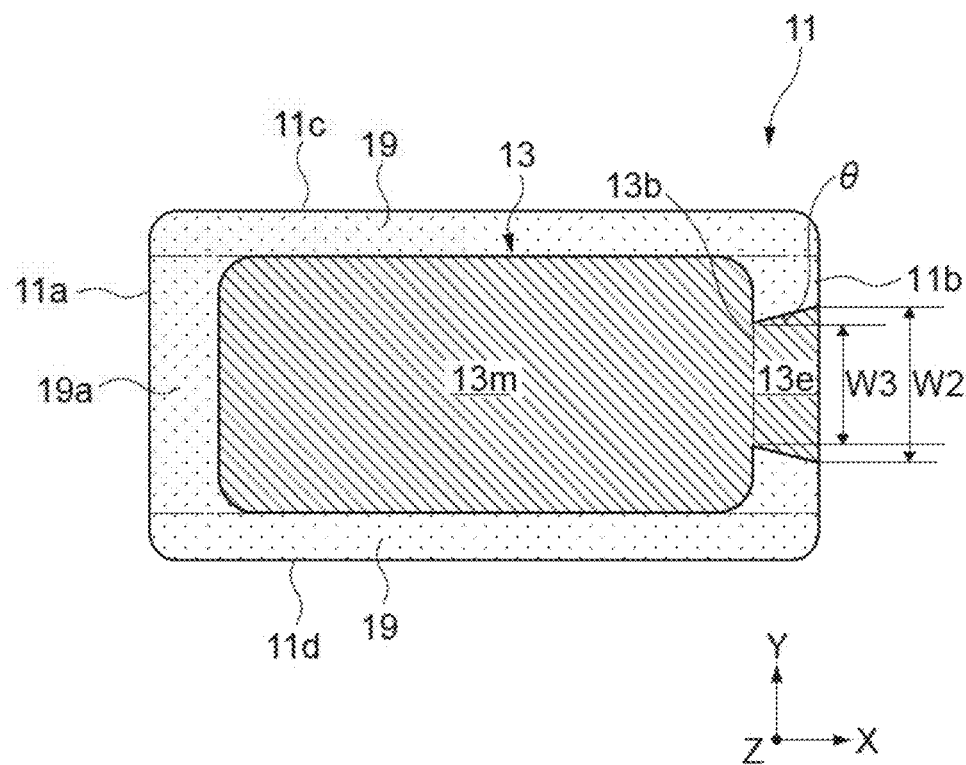
FIG. 5 is a cross-sectional view of the ceramic body of the multi-layer ceramic capacitor taken along the X-Y plane.

FIGS. 4 and 5 are each a cross-sectional view of the ceramic body 11 taken along the X-Y plane. FIG. 4 is a view cut along the first internal electrode 12. FIG. 5 is a view cut along the second internal electrode 13.

The first internal electrode 12 includes a first main electrode 12m having a planar shape extending in the X-axis direction and the Y-axis direction and a first drawn portion 12e extending from the first main electrode 12m to the end surface 11a. The first main electrode 12m is configured to have a substantially rectangular shape. On the end surface 11b side of the first internal electrode 12, a second end margin 19b to be described later is provided. With this configuration, the first internal electrode 12 is apart from the second external electrode 15 and connected to only the first external electrode 14.

The first drawn portion 12e is configured to have a tapered shape, and its width dimension along the Y-axis direction gradually decreases toward the end surface 11a. The first drawn portion 12e is configured to have a trapezoidal shape that is linearly symmetrical with a straight line parallel to the X-axis direction and that forms an angle θ defined by the first drawn portion 12e and the straight line. The first drawn portion 12e has a width dimension W1 at a boundary 12b with the first main electrode 12m and a width dimension W2 in the end surface 11a of the first drawn portion 12e. The width dimension W1 is the same as a width dimension of the first main electrode 12m. The width dimension W2 is smaller than the width dimension W1.

As shown in FIG. 5, the second internal electrode 13 includes a second main electrode 13m having a planar shape extending in the X-axis direction and the Y-axis direction and a second drawn portion 13e extending from the second main electrode 13m to the end surface 11b. The second main electrode 13m is configured to have a substantially rectangular shape that is the same as the shape of the first main electrode 12m. On the end surface 11a side of the second internal electrode 13, a first end margin 19a to be described later is provided. With this configuration, the second internal electrode 13 is apart from the first external electrode 14 and connected to only the second external electrode 15.

The second drawn portion 13e is also configured to have a tapered shape, and its width dimension along the Y-axis direction gradually increases toward the end surface 11b. The second drawn portion 13e is also configured to have a trapezoidal shape that is linearly symmetrical with the straight line parallel to the X-axis direction and that forms an angle θ defined by the second drawn portion 13e and the straight line. In other words, the second drawn portion 13e has a similarity shape with respect to the first drawn portion 12e. The second drawn portion 13e has a width dimension W3 at a boundary 13b with the second main electrode 13m. The width dimension W3 is smaller than the width dimension of the second main electrode 13m. Further, the second drawn portion 13e has a width dimension W2 in the end surface 11b of the second drawn portion 13e. The width dimension W2 is almost the same as the width dimension of the first drawn portion 12e in the end surface 11a along the Y-axis direction.

Typically, the first internal electrodes 12 and the second internal electrodes 13 are made of nickel (Ni) as a main component and function as internal electrodes of the multi-layer ceramic capacitor 10. It should be noted that the first internal electrodes 12 and the second internal electrodes 13 may be made of at least one of copper (Cu), silver (Ag), or platinum (Pt), other than nickel, as a main component.

As shown in FIGS. 2 and 3, the ceramic body 11 includes a capacitance forming unit 16 in which the first main electrodes 12m and the second main electrodes 13m are alternately laminated in the Z-axis direction while sandwiching the ceramic layers 21 therebetween. When a voltage is applied between the first external electrode 14 and the second external electrode 15 in the multi-layer ceramic capacitor 10, the voltage is applied to the ceramic layers 21 between the first main electrodes 12m and the second main electrodes 13m. Thus, the capacitance forming unit 16 stores charge corresponding to the voltage. The capacitance forming unit 16 is configured as a functional unit in this embodiment.

In order to increase capacitances of the ceramic layers 21, the ceramic layers 21 are made of dielectric ceramics having a high dielectric constant. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layers 21 may be made of a strontium titanate ($SrTiO_3$) based material, a calcium titanate (CaTiO$_3$) based material, a magnesium titanate (MgTiO$_3$) based material, a calcium zirconate (CaZrO$_3$) based material, a calcium zirconate titanate (Ca(Zr,Ti)O$_3$) based material, a barium zirconate (BaZrO$_3$) based material, a titanium oxide (TiO$_2$) based material, or the like.

The ceramic body 11 further includes, in the periphery of the capacitance forming unit 16, a first end portion 17a, a second end portion 17b, and a pair of side margins 18.

The first end portion 17a is provided to the capacitance forming unit 16 outward in the X-axis direction and constitutes the end surface 11a.

The first end portion 17a includes the first drawn portions 12e of the first internal electrodes 12 and the first end margins 19a. The first end margins 19a are each provided to the second main electrode 13m outward in the X-axis direction and are laminated alternately with the first drawn portions 12e in the Z-axis direction. The width dimension of the first end margin 19a in the Y-axis direction is configured to be substantially the same as the width dimension of the capacitance forming unit 16 in the Y-axis direction.

The second end portion 17b is provided to the capacitance forming unit 16 outward in the X-axis direction and constitutes the end surface 11b.

The second end portion 17b includes the second drawn portions 13e of the second internal electrodes 13 and the second end margins 19b. The second end margins 19b are each provided to the first main electrode 12m outward in the X-axis direction and are laminated alternately with the second drawn portions 13e in the Z-axis direction. The width dimension of the second end margin 19b in the Y-axis direction is configured to be substantially the same as the width dimension of the capacitance forming unit 16 in the Y-axis direction.

The side margins 18 cover the capacitance forming unit 16, the first end portion 17a, and the second end portion 17b in the Y-axis direction and constitute the side surfaces 11c and 11d provided to the capacitance forming unit 16 outward in the Y-axis direction. As shown in FIGS. 4 and 5, the side margins 18 extend over the entire multi-layer ceramic capacitor 10 in the X-axis direction and have a substantially constant width dimension in the Y-axis direction.

Moreover, the ceramic body 11 includes a pair of covers 20 that cover the capacitance forming unit 16, the first end portion 17a, the second end portion 17b, and the pair of side margins 18 in the Z-axis direction.

The first end margin 19a, the second end margin 19b, the side margin 18, and the cover 20 are made of insulating ceramics. Moreover, if those units are made of dielectric ceramics similar to that of the ceramic layers 21, internal stress in the ceramic body 11 is suppressed.

As described above, the first drawn portion 12e and the second drawn portion 13e are each configured to have a tapered shape. With this configuration, the dimensions of the first end margin 19a, the second end margin 19b, and the side margin 18 can be detected on the basis of the dimensions and arrangement of the first drawn portion 12e and the second drawn portion 13e, which are exposed from the end surfaces 11a and 11b, respectively. This will be described later in detail in the section of "Method of Producing Multi-layer Ceramic Capacitor 10".

2. Method of Producing Multi-Layer Ceramic Capacitor 10

Figure 6:
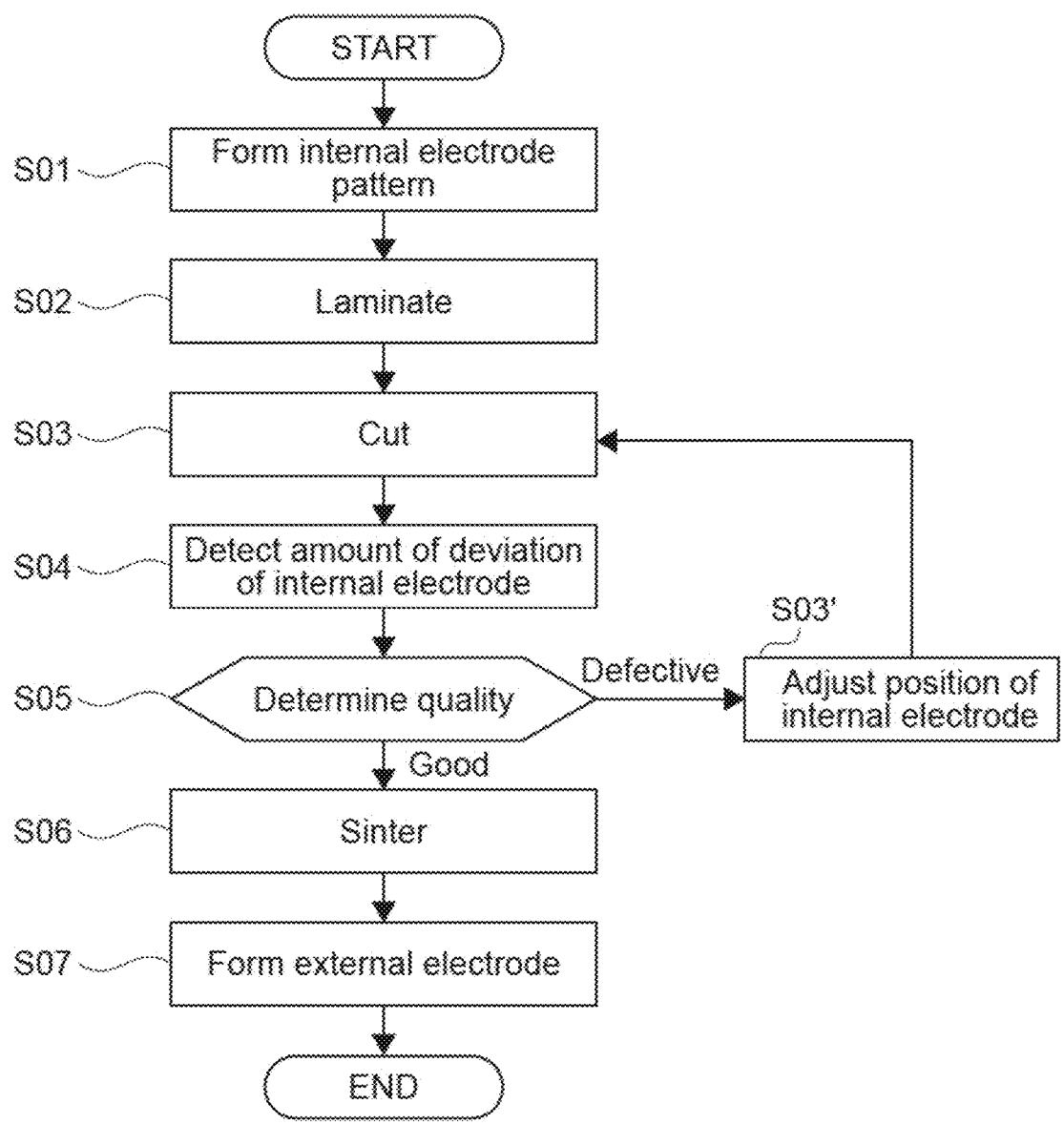
FIG. 6 is a flowchart showing a method of producing the multi-layer ceramic capacitor.

FIG. 6 is a flowchart showing a method of producing the multi-layer ceramic capacitor 10. FIGS. 7A to 16 are views each showing a production process of the multi-layer ceramic capacitor 10. Hereinafter, the method of producing the multi-layer ceramic capacitor 10 will be described along FIG. 6 with reference to FIGS. 7A to 16 as appropriate.

2.1 Step S01: Formation of Internal Electrode Pattern

In Step S01, internal electrode patterns 110 are formed on first ceramic sheets 101 and second ceramic sheets 102.

Figure 7A:
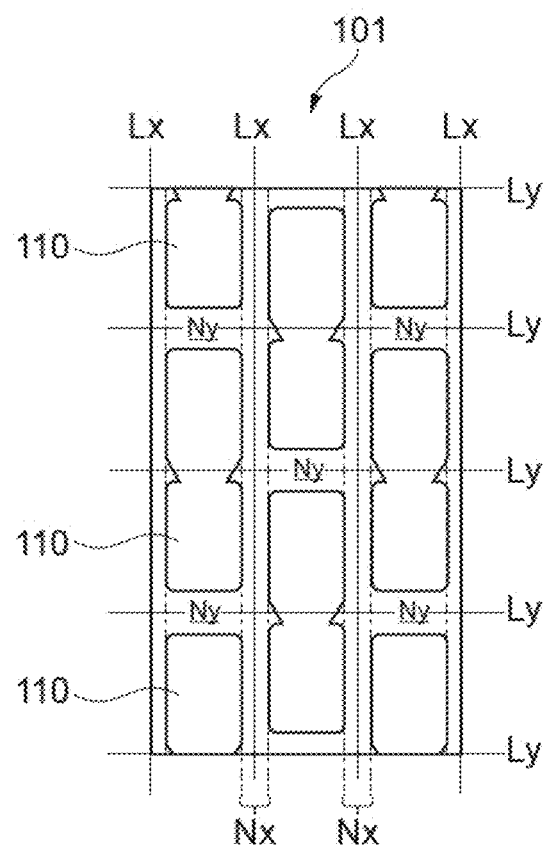
FIGS. 7A and 7B are each a plan view showing a production process of the multi-layer ceramic capacitor.
Figure 7B:
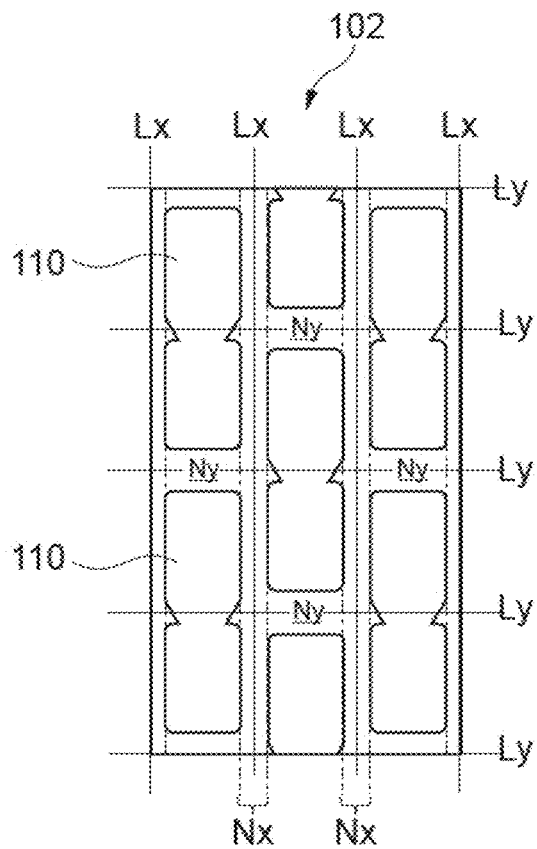

FIGS. 7A and 7B are plan views of the first ceramic sheet 101 and the second ceramic sheet 102, respectively. At this stage, the first ceramic sheet 101 and the second ceramic sheet 102 are each configured as a large-sized sheet that is not singulated. FIGS. 7A and 7B each show design cutting lines Lx and Ly used when the sheets are singulated into the multi-layer ceramic capacitors 10. The cutting lines Lx are parallel to the X axis, and the cutting lines Ly are parallel to the Y axis. It should be noted that FIGS. 7A and 7B show part of the first ceramic sheet 101 and the second ceramic sheet 102, respectively.

The first ceramic sheet 101 and the second ceramic sheet 102 are each configured as an unsintered dielectric green sheet containing dielectric ceramics as a main component. Each of the first ceramic sheet 101 and the second ceramic sheet 102 is formed into a sheet by using, for example, a roll coater or a doctor blade. The thickness of the first ceramic sheet 101 and the thickness of the second ceramic sheets 102 are adjustable as appropriate.

The internal electrode patterns 110 can be formed by applying an optional electrically conductive paste to the first ceramic sheets 101 and the second ceramic sheets 102. A method of applying the electrically conductive paste can be optionally selected from well-known techniques. For example, for the application of the electrically conductive paste, a screen printing method or a gravure printing method can be used.

The internal electrode patterns 110 are arrayed in the X-axis direction via insulation zones Ny and in the Y-axis direction via insulation zones Nx. The cutting line Ly extends so as to alternately pass through the insulation zone Ny and a tapered portion 114 along the Y-axis direction. The cutting line Lx extends on the insulation zone Nx along the X-axis direction.

In the first ceramic sheet 101 and the second ceramic sheet 102, the shape of each internal electrode pattern 110 and the arrangement form thereof are the same. However, the internal electrode patterns 110 of the second ceramic sheet 102 are formed with a shift corresponding to one chip in the X-axis direction or the Y-axis direction with respect to the internal electrode patterns 110 of the first ceramic sheet 101.

Figure 8:
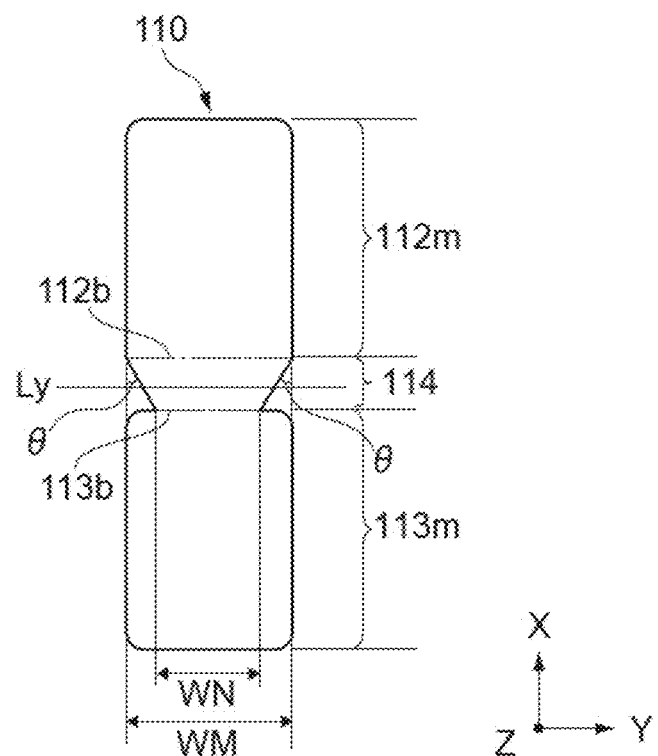
FIG. 8 is a plan view showing a production process of the multi-layer ceramic capacitor.

FIG. 8 is a partially enlarged view of FIGS. 7A and 7B, which shows the shape of the internal electrode pattern 110.

The internal electrode pattern 110 includes a pair of main electrodes 112m and 113m facing each other in the X-axis direction and the tapered portion 114 that has a tapered shape and connects the pair of main electrodes 112m and 113m. Each of the main electrodes 112m and 113m has a planar shape extending in the X-axis direction and the Y-axis direction and is configured to have a substantially rectangular shape.

The tapered portion 114 has a configuration in which the width dimension in the Y-axis direction gradually changes along the X-axis direction. In the tapered portion 114 of this embodiment, the width dimension along the Y-axis direction gradually decreases from one main electrode 112m toward the other main electrode 113m. In other words, the tapered portion 114 has a trapezoidal shape that forms an angle θ together with the straight line parallel to the X-axis direction. It should be noted that the tapered portion 114 functions as a narrow width portion in this embodiment. The narrow width portion connects the main electrode 112m and the main electrode 113m to each other, and has a width dimension in the Y-axis direction that changes along the X-axis direction.

The tapered portion 114 has a boundary 112b with the main electrode 112m, and the boundary 112b has a width dimension WM that is substantially the same as a width dimension of the main electrode 112m. The tapered portion 114 has a boundary 113b with the main electrode 113m, and the boundary 113b has a width dimension WN that is smaller than the width dimension WM.

The cutting line Ly passes through the center portion of the tapered portion 114 in the X-axis direction. Each internal electrode pattern 110 is cut in the cutting step of Step S03 to be performed later, and then divided into two internal electrodes. In other words, the main electrode 112m and a segment of the tapered portion 114 connected thereto of the internal electrode pattern 110 form the first internal electrode 12 of the multi-layer ceramic capacitor 10. The main electrode 113m and a segment of the tapered portion 114 connected thereto of the internal electrode pattern 110 form the second internal electrode 13 of another multi-layer ceramic capacitor 10.

It should be noted that, in the internal electrode patterns on the first ceramic sheet 101 and the second ceramic sheet 102, all of the internal electrode patterns may be configured by the internal electrode patterns 110 or part of the internal electrode patterns may be configured by the internal electrode patterns 110. In the latter case, for example, it may be possible to form the internal electrode patterns 110 only in a region of a block B, which will be described later, and form rectangular internal electrode patterns having no tapered portions in other regions.

2.2 Step S02: Lamination

Figure 9:
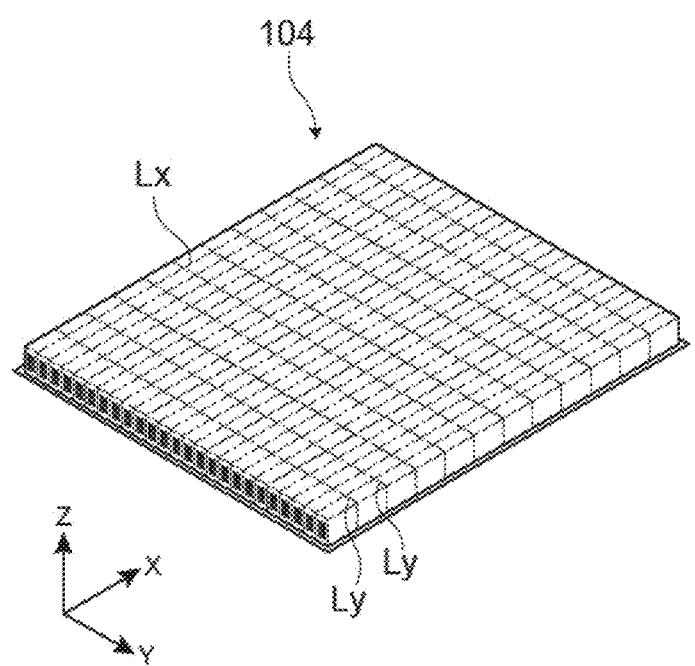
FIG. 9 is a perspective view showing a production process of the multi-layer ceramic capacitor.

In Step S02, the first ceramic sheets 101 and the second ceramic sheets 102 on which the internal electrode patterns 110 are formed in Step S01 are laminated in the Z-axis direction, to produce a multi-layer sheet 104 shown in FIG. 9. The multi-layer sheet 104 is configured to have a flat plate-like shape along the X-axis direction and the Y-axis direction and can be singulated into a large number of chips.

The multi-layer sheet 104 is integrated by pressure-bonding the first ceramic sheets 101 and the second ceramic sheets 102. For the pressure-bonding of the first ceramic sheets 101 and the second ceramic sheets 102, for example, hydrostatic pressing or uniaxial pressing is favorably used. This makes it possible to obtain a high-density multi-layer sheet 104.

Figure 10:
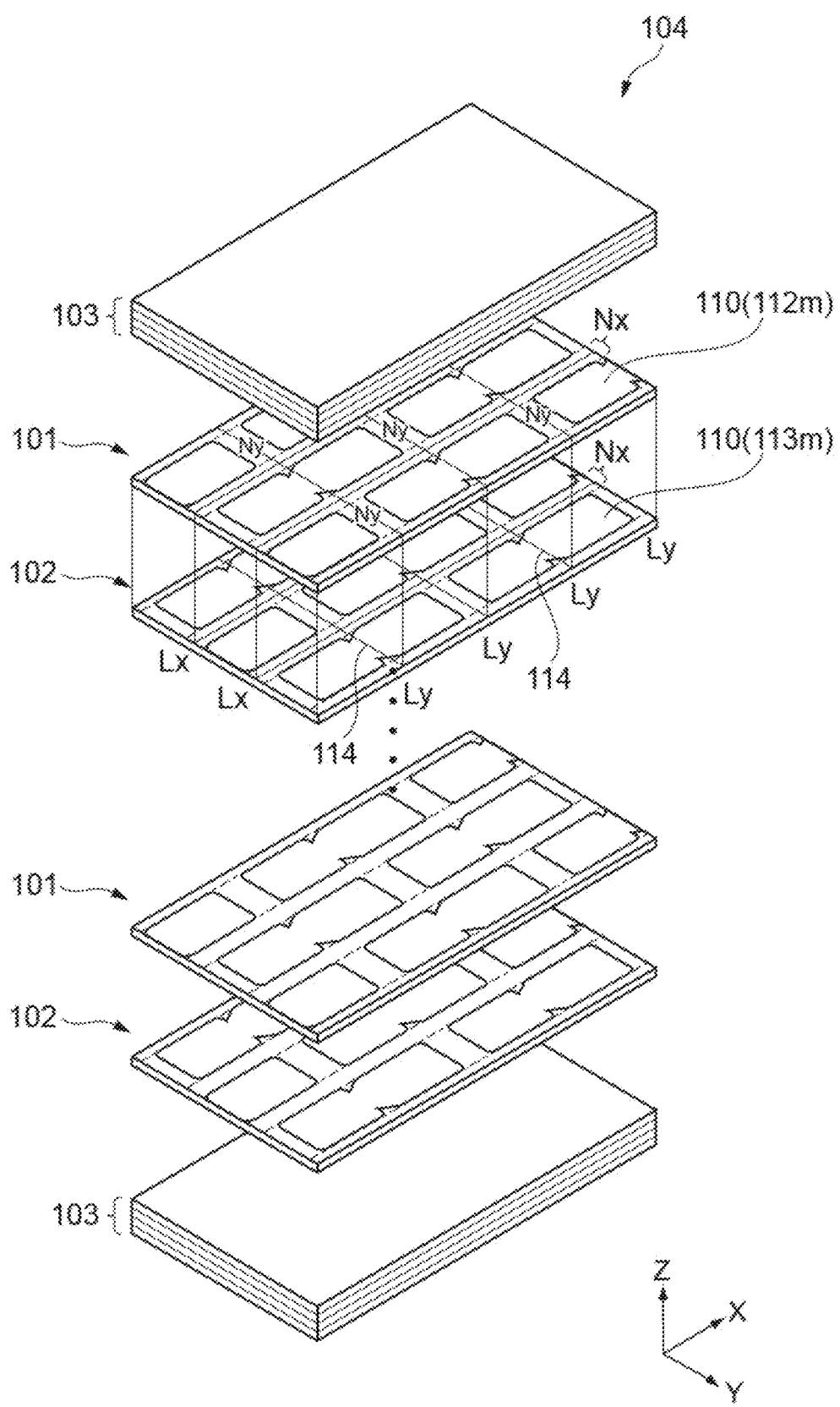
FIG. 10 is a perspective view showing a production process of the multi-layer ceramic capacitor.

As shown in FIG. 10, in the multi-layer sheet 104, the first ceramic sheets 101 and the second ceramic sheets 102 are alternately laminated in the Z-axis direction. Third ceramic sheets 103 on which no internal electrode patterns 110 are formed are laminated on the top and the bottom of the laminate including the first ceramic sheets 101 and the second ceramic sheets 102 in the Z-axis direction. The laminate of the third ceramic sheets 103 corresponds to the cover 20 after sintering. It should be noted that FIG. 10 schematically shows a part of the multi-layer sheet 104 of FIG. 9.

In the multi-layer sheet 104, the first ceramic sheet 101 and the second ceramic sheet 102 are laminated such that the internal electrode patterns 110 of the first ceramic sheet 101 and the second ceramic sheet 102 face each other in the Z-axis direction. The main electrodes 112m of the first ceramic sheets 101 are laminated alternately with the main electrodes 113m of the second ceramic sheets 102 in the Z-axis direction, and the main electrodes 112m of the second ceramic sheets 102 are laminated alternately with the main electrodes 113m of the first ceramic sheets 101 in the Z-axis direction. A region in which the main electrodes 112m and 113m are laminated corresponds to the capacitance forming unit 16 after sintering. Further, the insulation zones Ny of the first ceramic sheets 101 are laminated alternately with the tapered portions 114 of the second ceramic sheets 102, and the insulation zones Ny of the second ceramic sheets 102 are laminated alternately with the tapered portions 114 of the first ceramic sheets 101. A region in which the insulation zones Ny and the tapered portions 114 are laminated corresponds to each of the first end margin 19a and the second end margin 19b after sintering. Further, a region in which the insulation zones Nx of the first ceramic sheets 101 and the second ceramic sheets 102 are laminated in the Z-axis direction corresponds to the side margin 18 after sintering.

2.3 Step S03: Cutting

In Step S03, the multi-layer sheet 104 obtained in Step S02 is cut along the X-axis direction and the Y-axis direction, to produce an unsintered ceramic body 111.

Figure 11:
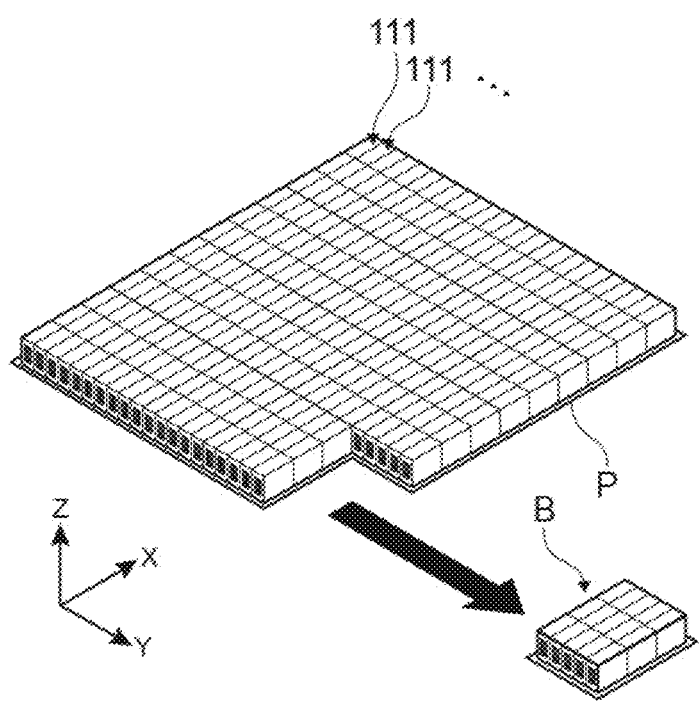
FIG. 11 is a perspective view showing a production process of the multi-layer ceramic capacitor.

FIG. 11 is a view showing a state where the multi-layer sheet 104 is cut, and a plurality of ceramic bodies 111 are produced. If the multi-layer sheet 104 is disposed on an adhesive sheet P and then cut, the plurality of the ceramic bodies 111 can be handled for each block B. Accordingly, a visual inspection to be performed later can be performed on the plurality of the ceramic bodies 111 at one time.

Figure 12:
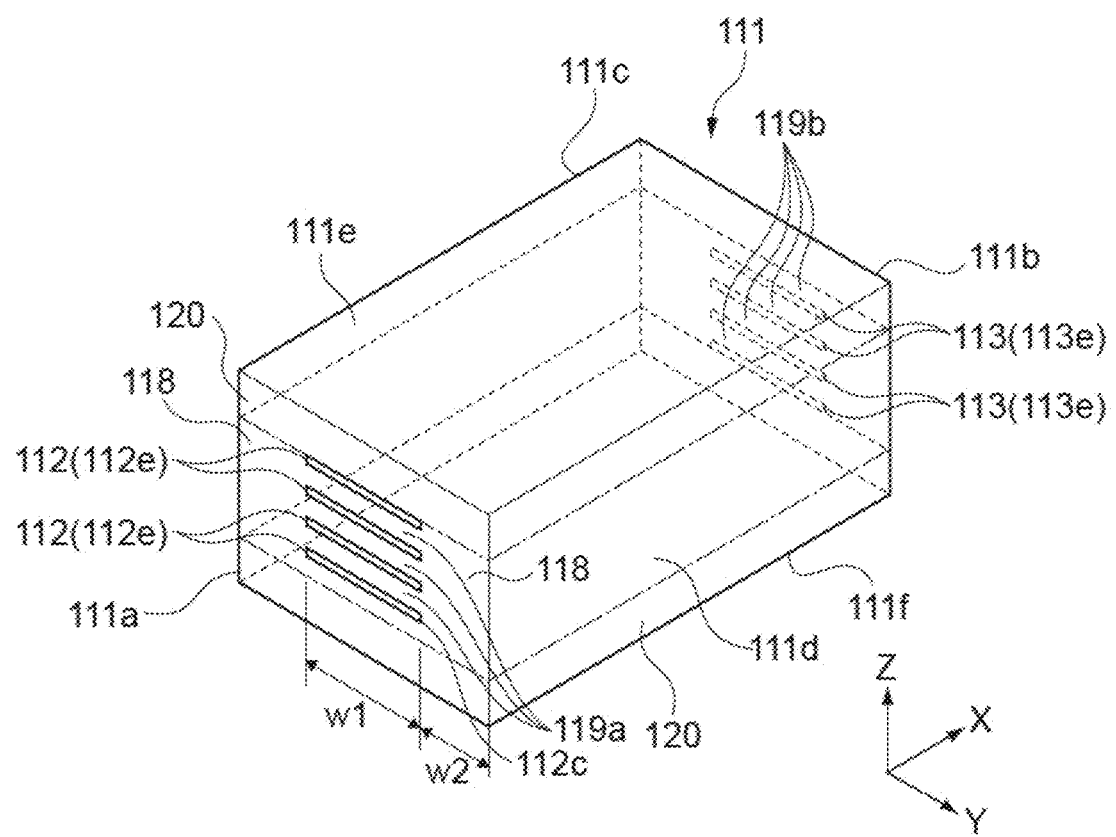
FIG. 12 is a perspective view showing a production process of the multi-layer ceramic capacitor.

FIG. 12 is a perspective view of the ceramic body 111 obtained in Step S03.

The unsintered ceramic body 111 has two end surfaces 111a and 111b facing in the X-axis direction, two side surfaces 111c and 111d facing in the Y-axis direction, and two main surfaces 111e and 111f facing in the Z-axis direction. The end surfaces 111a and 111b are each configured as a first cut surface formed by being cut along the Y-axis direction. The side surfaces 111c and 111d are each configured as a second cut surface formed by being cut along the X-axis direction. The main surfaces 111e and 111f are each configured by an unsintered cover 120 formed by cutting the third ceramic sheet 103.

Figure 13:
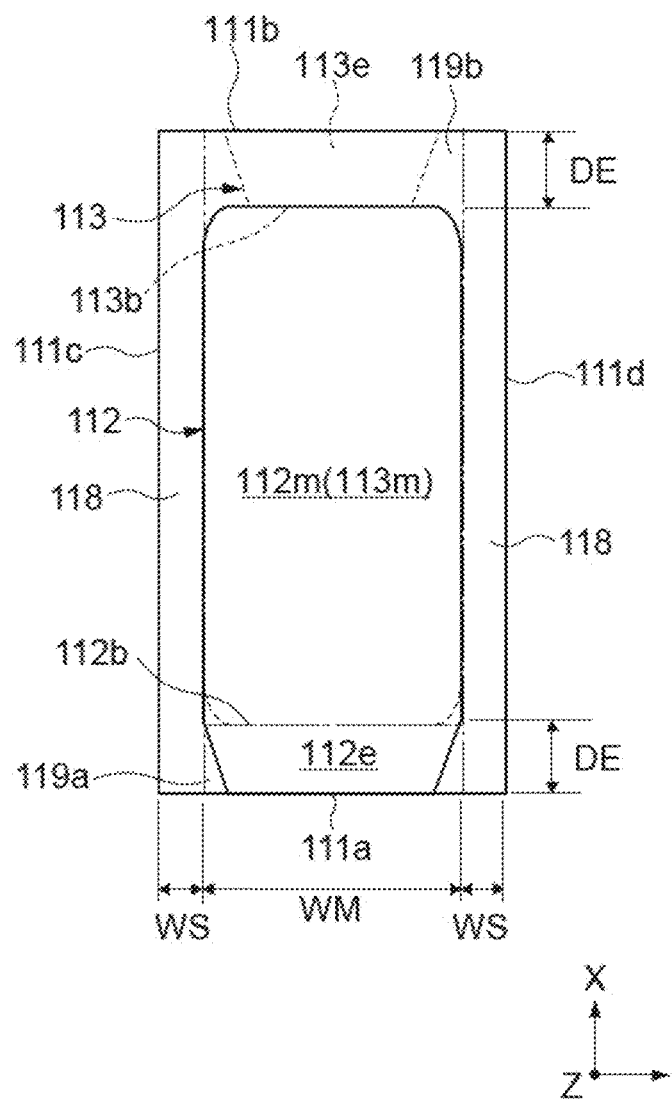
FIG. 13 is a plan view showing a production process of the multi-layer ceramic capacitor.

FIG. 13 is a cross-sectional view of the ceramic body 111 cut along the X-Y plane, the ceramic body 111 being cut along the design cutting lines Lx and Ly. It should be noted that in FIGS. 13 to 15, hatching is omitted for the purposes of illustration.

A first internal electrode 112 includes the one main electrode 112m and a drawn portion 112e obtained by cutting the tapered portion 114. The drawn portion 112e extends from the main electrode 112m to the end surface 111a, and the width dimension thereof in the Y-axis direction gradually decreases toward the end surface 111a.

A second internal electrode 113 includes the other main electrode 113m and a drawn portion 113e obtained by cutting the tapered portion 114. The drawn portion 113e extends from the main electrode 113m to the end surface 111b.

The ceramic body 111 is configured such that the unsintered first internal electrodes 112 and the unsintered second internal electrodes 113 are alternately laminated in the Z-axis direction and the main electrodes 112m and 113m face each other in the Z-axis direction. The main electrodes 112m and 113m are designed such that the positions thereof on the X-Y plane coincide with each other.

The drawn portion 112e and unsintered end margins 119a are exposed at the end surface 111a. The drawn portion 113e and unsintered end margins 119b are exposed at the end surface 111b. The end margins 119a and 119b are formed when the insulation zones Ny are cut along the Y-axis direction. The drawn portion 112e is formed when the tapered portion 114 is cut along the Y-axis direction.

Side margins 118 are exposed at both the side surfaces 111c and 111d. The side margins 118 are formed when the insulation zones Nx of the first ceramic sheets 101 and the second ceramic sheets 102 are cut along the X-axis direction and the Y-axis direction. The cut surface obtained by cutting the insulation zone Nx along the X-axis direction corresponds to the side surface of the side margin 118, which is exposed from each of the side surfaces 111c and 111d.

It should be noted that when the insulation zone Nx is also cut along the Y-axis direction, the side margin 118 is exposed also at a circumferential portion of each of the end surfaces 111a and 111b in the Y-axis direction.

As shown in FIG. 13, when the cutting is performed along the design cutting lines Lx and Ly, the first and second internal electrodes 112 and 113 are each disposed at a design position having no deviation in the X-axis direction and the Y-axis direction. Specifically, the first and second internal electrodes 112 and 113 are each disposed such that the center thereof in the Y-axis direction coincides with the center of the ceramic body 111 in the Y-axis direction and such that the center of each of the main electrodes 112m and 113m in the X-axis direction coincides with the center of the ceramic body 111 in the X-axis direction.

The pair of side margins 118 are designed so as to have the same width dimension along the Y-axis direction. A design value of the width dimension of the side margin 118 is assumed as a width dimension WS.

Similarly, the end margins 119a and 119b are also designed so as to have the same length dimension along the X-axis direction. A design value of the length dimension of each of the end margins 119a and 119b is assumed as a length dimension DE.

Meanwhile, in the cutting step of Step S03, the first ceramic sheets 101 and the second ceramic sheets 102 may not be cut at the design cut positions. This results from the deviation of the cut positions along the X- and Y-axis directions, which may occur in the cutting step of Step S03, or deviation of the lamination positions of the first ceramic sheets 101 and the second ceramic sheets 102, which may occur in the lamination step of Step S02.

Figure 14:
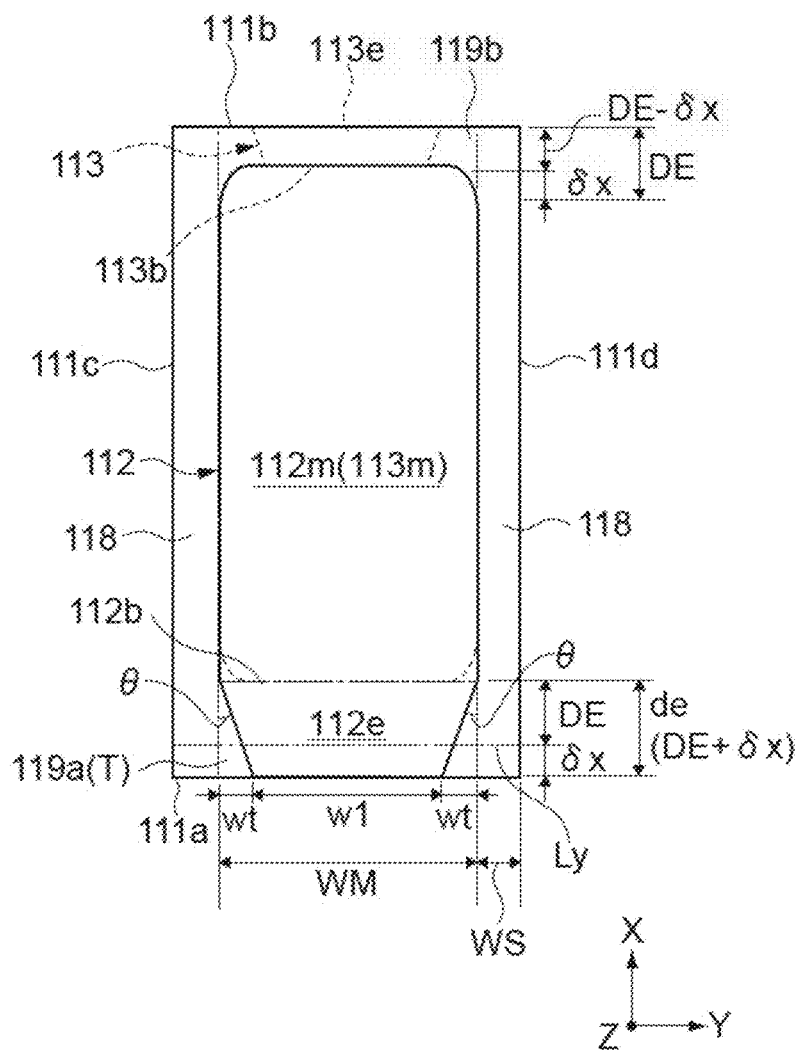
FIG. 14 is a plan view showing a production process of the multi-layer ceramic capacitor.

FIG. 14 is a view showing a state where the first internal electrode 112 or the second internal electrode 113 deviates from the design position in the X-axis direction. In this case, an actual length dimension de of the end margin 119a or 119b is a value that increases or decreases by δx from the length dimension DE as the design value. When the amount of deviation δx of the first internal electrode 112 or the second internal electrode 113 is large, a sufficient size is difficult to ensure for a length dimension of the shorter end margin 119b (DE-δx), which makes it difficult to ensure the desired insulation properties and environment resistance.

Figure 15:
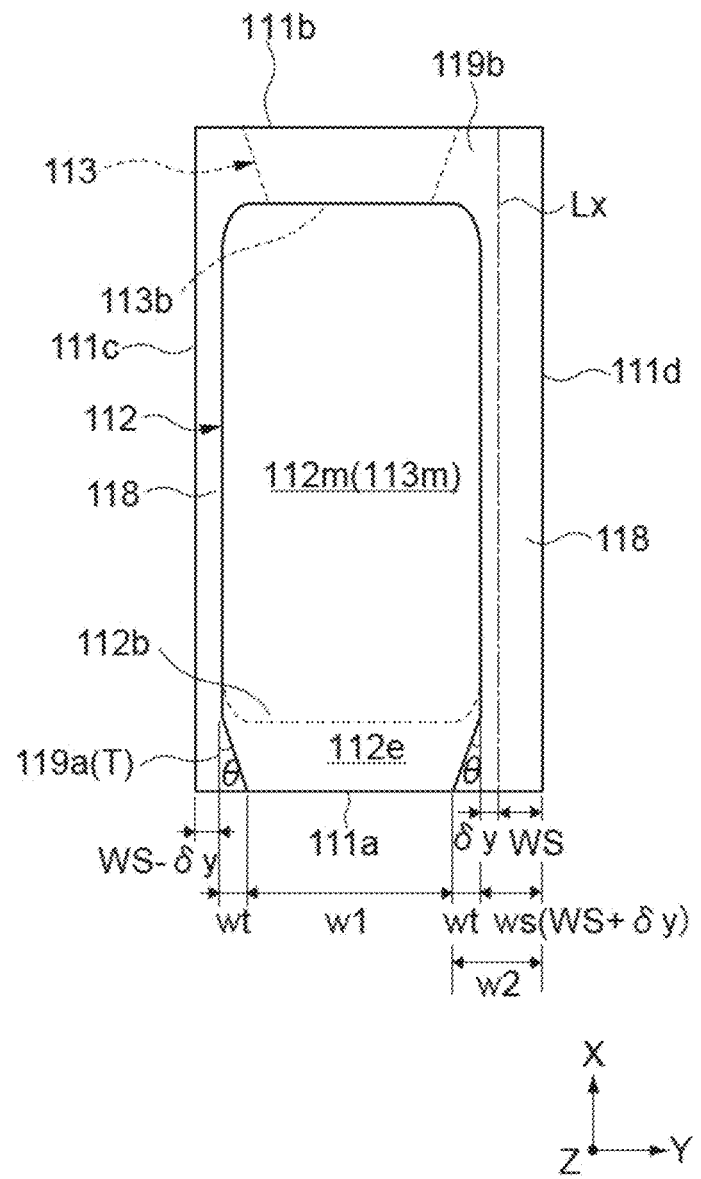
FIG. 15 is a plan view showing a production process of the multi-layer ceramic capacitor.

FIG. 15 is a view showing a state where the first internal electrode 112 or the second internal electrode 113 deviates from the design position in the Y-axis direction. In this case, an actual width dimension ws of the side margin 118 is a value that increases or decreases by δy from the width dimension WS as the design value. When the amount of deviation δy of the first internal electrode 112 or the second internal electrode 113 is large, a sufficient size is difficult to ensure for a width dimension of the shorter side margin 118 (WS-δy), which makes it difficult to ensure the desired insulation properties and environment resistance.

In this regard, in this embodiment, the amounts of deviation δx and δy of the first internal electrode 112 or the second internal electrode 113 are detected in Step S04, and the quality of the ceramic body 111 is determined on the basis of the amounts of deviation δx and δy in Step 505.

2.4 Step S04: Detection of Amount of Deviation of Internal Electrode

In Step S04, at least one of the end surface 111a or the end surface 111b is subjected to a visual inspection, to detect the amounts of deviation δx and δy of the first and second internal electrodes 112 and 113 from the design positions. Hereinafter, an embodiment of detecting the amount of deviation of the first internal electrode 112 on the basis of the appearance of the end surface 111a will be described, but the amount of deviation of the second internal electrode 113 can also be detected in a similar manner on the basis of the appearance of the end surface 111b.

In Step S04, with reference to FIGS. 12 to 15, a width dimension w1 of the drawn portion 112e along the Y-axis direction and a width dimension w2 along the Y-axis direction from an end portion 112c of the drawn portion 112e in the Y-axis direction to the side surface 111d are measured, the drawn portion 112e being exposed from the end surface 111a.

The tapered portion 114 has a width dimension along the Y-axis direction that gradually decreases from the main electrode 112m toward the other main electrode 113m. Accordingly, the width dimension w1 of the drawn portion 112e decreases as the cut position along the Y-axis direction becomes closer to the main electrode 113m. In other words, the width dimension w1 correlates with the amount of deviation δx of the first internal electrode 112 or the second internal electrode 113 in the X-axis direction. Therefore, when the width dimension w1 is measured, the amount of deviation δx of the first internal electrode 112 in the X-axis direction can be detected.

Further, when the cut position along the X-axis direction is deviated from the design cutting line Lx, the arrangement of the drawn portion 112e exposed from the end surface 111a is deviated in the Y-axis direction. Accordingly, when the width dimension w2 along the Y-axis direction from the end portion 112c of the drawn portion 112e in the Y-axis direction to the side surface 111d is measured, the amount of deviation δy of the first internal electrode 112 in the Y-axis direction can be detected.

With reference to FIG. 14, description will be given on a method of calculating the amount of deviation δx by using the width dimension w1 in a case where the tapered portion 114 (drawn portion 112e) has a trapezoidal shape linearly symmetrical with the X-axis direction.

The amount of deviation δx can be calculated as a difference between the length dimension de of the actual drawn portion 112e and end margin 119a and the design length dimension DE thereof. When the length dimension de is calculated from the width dimension w1, the amount of deviation δx can be detected.

It is assumed that the angle defined by the end margin 119a and the tapered portion 114 (drawn portion 112e) is θ. A portion of the end margin 119a, in which the tapered portion 114 (drawn portion 112e) is not laminated, is constituted by a right triangle T having the angle θ. Assuming that the bottom of the right triangle T has the length dimension de of the end margin 119a, a width dimension wt of the right triangle T in the Y-axis direction is expressed by Expression (1).

$$wt = \tan\theta \cdot de \tag{1}$$

Moreover, the width dimension WM along the Y-axis direction at the boundary 112b between the drawn portion 112$e$ and the main electrode 112$m$ is defined as a design value. In consideration of symmetry property of the drawn portion 112$e$ in the X-axis direction, w1, wt, and WM have a relationship of the following Expression (2).

$$WM=w1+2wt \quad (2)$$

When Expression (2) is substituted in Expression (1) and arranged, the length dimension de of the end margin 119$a$ can be expressed by the following Expression (3).

$$de=(WM-w1)/2 \tan \theta \quad (3)$$

From those expressions, the amount of deviation δx can be expressed as follows by using θ, DE, and WM as defined design values and the measured w1.

$$\delta x=de-DE$$

$$\delta x=\{(WM-w1)/2 \tan \theta\}-DE \quad (4)$$

In this embodiment, the orientation of the deviation can also be determined depending on whether the amount of deviation δx is positive or negative. In other words, when the amount of deviation δx is positive, the length dimension DE of the actual drawn portion 112$e$ (end margin 119$a$) is larger than the design length dimension DE, and thus it can be determined that the first internal electrode 112 is deviated to the end surface 111$b$ side. When the amount of deviation δx is negative, the length dimension DE of the actual drawn portion 112$e$ (end margin 119$a$) is smaller than the design length dimension DE, it can be determined that the first internal electrode 112 is deviated to the end surface 111$a$ side.

Subsequently, with reference to FIG. 15, description will be given on a method of calculating the amount of deviation δy by using the width dimension w2 in a case where the tapered portion 114 (drawn portion 112$e$) has a trapezoidal shape linearly symmetrical with the X-axis direction.

The amount of deviation δy can be calculated as a difference between the width dimension ws of the actual side margin 118 and the design width dimension WS thereof. When the width dimension ws of the side margin 118 is calculated from the measured width dimension w2, the amount of deviation δy can be detected. It should be noted that an example of detecting the amount of deviation δy on the basis of the width dimension w2 on the side surface 111$d$ side will be hereinafter described, but the amount of deviation δy can be detected in a similar manner on the side surface 111$c$ side.

In the example shown in FIG. 15, the width dimension ws of the actual side margin 118 can be expressed by the following Expression (5) by using the width dimension w2 as the measured value and the wt calculated by Expression (1).

$$ws=w2-wt$$

$$ws=w2-(WM-w1)/2 \quad (5)$$

Accordingly, the amount of deviation δy of the first internal electrode 112 can be expressed by the following Expression (6) by using the calculated width dimension ws and the design value WS.

$$\delta y=ws-WS$$

$$\delta y=w2-(WM-w1)/2-WS \quad (6)$$

The orientation of the deviation in the Y-axis direction can also be determined depending on whether the amount of deviation δy is positive or negative. In other words, when the amount of deviation δy is positive, the width dimension of the actual side margin 118 is larger than the design length dimension WS, and thus it can be determined that the first internal electrode 112 is deviated to the side surface 111$c$ side. When the amount of deviation δy is negative, the width dimension of the actual side margin 118 is smaller than the design length dimension WS, it can be determined that the first internal electrode 112 is deviated to the side surface 111$d$ side.

As described above, the appearance of the end surface 111$a$ is inspected, and the width dimensions w1 and w2 are measured, so that the amounts of deviation δx and δy of the first internal electrode 112 in the X- and Y-axis directions and the orientation of the deviation thereof can be calculated. Accordingly, the processing of Step S04 can be automated.

For example, as shown in FIG. 11, a block B, which is one of the blocks obtained by segmenting a single multi-layer sheet 104 and includes a plurality of ceramic bodies 111, is transferred.

Figure 16:
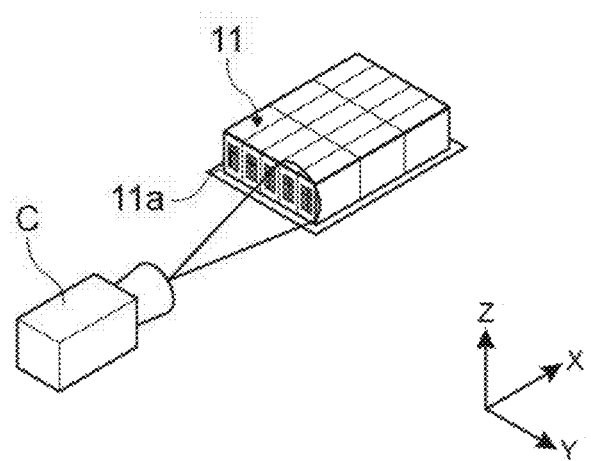
FIG. 16 is a perspective view showing a production process of the multi-layer ceramic capacitor.

Subsequently, as shown in FIG. 16, the end surface 111$a$ side of the block B is imaged with an imaging device C. Subsequently, an information processing device analyzes the sizes of the width dimensions w1 and w2 on the basis of the captured image of the end surface 111$a$, and automatically performs calculation corresponding to Expressions (1) to (6) described above.

Accordingly, the amounts of deviation δx and δy are automatically detected.

2.5 Step S05: Determination of Quality

In Step S05, whether the amounts of deviation δx and δy detected in Step S04 each fall within a predetermined range or not is determined. In other words, when the value of the amount of deviation δx falls within a range recognized as being proper, and the value of the amount of deviation δy falls within a range recognized as being proper, the ceramic body 111 is determined as being good, and the processing proceeds to Step S06.

In Step 505, in order to determine whether the amounts of deviation δx and δy each fall within a predetermined range or not, it is determined whether the width dimension w1 falls within a first range or not and whether the width dimension w2 falls within a second range or not. In other words, the amount of deviation δx can be uniquely derived from the width dimension w1 on the basis of Expression (4), and the amount of deviation δy can be uniquely derived from the width dimension w2 on the basis of Expression (6). Therefore, the first range of the width dimension w1, which corresponds to the proper range of the amount of deviation δx, and the second range of the width dimension w2, which corresponds to the proper range of the amount of deviation δy, can be defined.

In other words, when the width dimension w1 measured in Step S04 falls within the first range and the width dimension w2 falls within the second range, the ceramic body 111 is determined as being good. Meanwhile, when at least one of the width dimension w1 or the width dimension w2 falls out of the range described above, the ceramic body 111 is determined as being defective.

Step S05 can be automated sequentially after the step of detecting the amount of deviation in Step S04. In other words, the information processing device analyzes the image of the end surface 111$a$, measures the width dimensions w1 and w2 of each ceramic body 111, and determines whether the width dimensions w1 and w2 fall within the set first and second ranges, respectively, so that the quality determination can be performed. Accordingly, the productivity can be enhanced, and the cost and time for the inspections can be reduced.

2.6 Step S06: Sintering

In Step S06, the unsintered ceramic body 111 determined as being good in Step S05 is sintered, and the ceramic body 11 shown in FIGS. 1 to 3 is produced. In other words, in Step S06, a capacitance forming unit 116 becomes the capacitance forming unit 16, the end margin 119a and the end margin 119b become the first end margin 19a and the second end margin 19b, respectively, the side margin 118 becomes the side margin 18, and the cover 120 becomes the cover 20. Sintering can be performed in a reduction atmosphere or a low-oxygen partial pressure atmosphere, for example.

2.7 Step S07: Formation of External Electrode

In Step S07, the first external electrode 14 and the second external electrode 15 are respectively formed on the end surface 11a and the end surface 11b of the ceramic body 11 obtained in Step S06, to produce the multi-layer ceramic capacitor 10 shown in FIGS. 1 to 3. In Step S07, first, an unsintered electrode material is applied to the end surfaces 11a and 11b and then baked to form base films. Subsequently, intermediate films and surface films are formed on those base films by plating such as electrolytic plating, thus forming the first external electrode 14 and the second external electrode 15.

2.8 Step S03': Adjustment of Position of Internal Electrode

Meanwhile, if the ceramic body 111 is determined as being defective in Step 505, the processing proceeds to Step S03', and the cut positions along the X-axis direction and the Y-axis direction in Step S03 are adjusted on the basis of the calculated amounts of deviation δx and δy. This can adjust the positions of the first and second internal electrodes 112 and 113 in the X-Y plane. Therefore, the failure rate of the products can be lowered, and the yield rate can be enhanced. Moreover, in this embodiment, the orientation of the deviation can also be determined depending on whether the amounts of deviation δx and δy are positive or negative. Thus, the cut positions can be adjusted more accurately.

After the cut positions are adjusted in Step S03', a multi-layer sheet newly produced in Step S03 is cut on the basis of the adjusted cut positions. This can enhance the position accuracy of the first and second internal electrodes 112 and 113 in the ceramic body.

Figure 17:
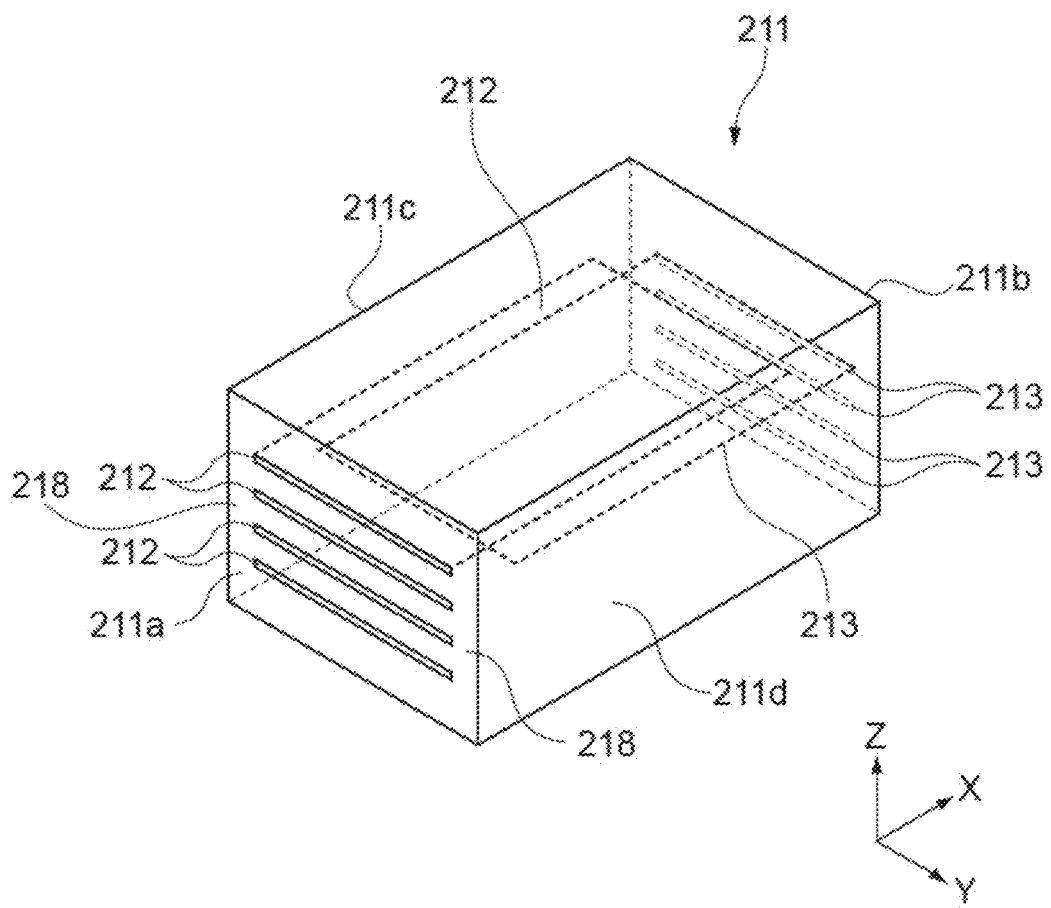
FIG. 17 is a perspective view of a ceramic body according to a comparative example of the first embodiment.

As shown in FIG. 17, in a ceramic body 211 including internal electrodes 212 and 213 having a general, substantially rectangular shape, the end margin is covered with a side margin 218. Accordingly, the arrangement of the internal electrodes 212 and 213 in the ceramic body 211 is difficult to determine by appearance.

Figure 18:
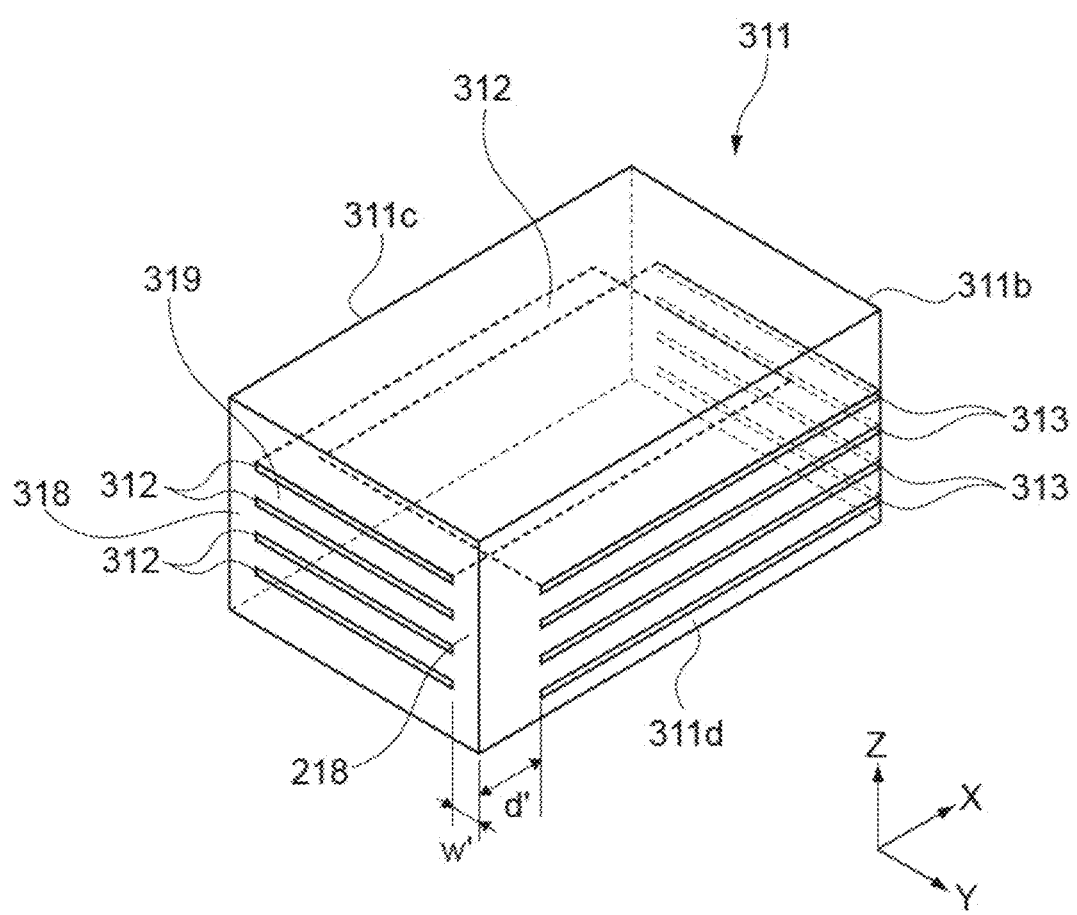
FIG. 18 is a perspective view of a testing ceramic body according to a comparative example of the first embodiment.

Examples of the configuration capable of detecting the deviation of the internal electrodes by appearance include a testing ceramic body 311 shown in FIG. 18. As with the case of the general ceramic body 211, in the testing ceramic body 311, first internal electrodes 312 are exposed from an end surface 311a, second internal electrodes 313 are exposed from an end surface 311b, and the second internal electrodes 313 are exposed from a side surface 311c. The second internal electrodes 313 are each formed into a rectangular shape having a constant length dimension.

In the testing ceramic body 311, a length dimension d' along the X-axis direction from an end portion of the second internal electrode 313 in the X-axis direction, the second internal electrode 313 being exposed at the side surface 311c, to the end surface 311a corresponds to the actual length dimension of the end margin 319. Accordingly, the amounts of deviation of the first and second internal electrodes 312 and 313 in the X-axis direction can be detected on the basis of a difference between the measured length dimension d' and the design value of the length dimension of the end margin 319.

Further, in the testing ceramic body 311, a width dimension w' along the Y-axis direction from an end portion of the first internal electrode 312 in the Y-axis direction, the first internal electrode 312 being exposed at the end surface 311a, to the side surface 311c corresponds to the actual width dimension of a side margin 318. Accordingly, the amounts of deviation of the first and second internal electrodes 312 and 313 in the Y-axis direction can be detected on the basis of a difference between the measured width dimension w' and the design value of the width dimension of the side margin 318.

In order to detect the amount of deviation by using the testing ceramic body 311, it is necessary to perform a visual inspection on at least two surfaces of the end surface 311a and the side surface 311c. Accordingly, in order to automate the imaging of the surfaces and the detection of the dimensions, it is necessary to switch the direction of one of the imaging device and the testing ceramic body 311 or install two imaging devices, which makes the device configuration complicated. Meanwhile, it is also possible for a human to observe the testing ceramic body 311 with a microscope and measure each dimension, which increases cost and requires time, resulting in reduction in productivity.

Moreover, the testing ceramic body 311 does not include the side margin 318 on the lateral side of the second internal electrode 313. Accordingly, the insulation properties and the environment resistance are difficult to ensure, and the testing ceramic body 311 cannot be put into production as a multi-layer ceramic capacitor. Therefore, all the testing ceramic bodies 311 used in the inspection are to be discarded, which lowers the yield rate.

Meanwhile, in the unsintered ceramic body 111 of this embodiment, both of the length dimension de of each of the end margins 119a and 119b and the width dimension ws of the side margin 118 can be detected by performing a visual inspection on the end surface 111a. Accordingly, the man-hour related to the detection of the amounts of deviation of the first and second internal electrodes 112 and 113 is reduced, and the automation by the imaging device, the information processing device, and the like is facilitated. Therefore, the cost for the inspection is reduced, and the productivity is largely improved.

Further, since the step of detecting the amount of deviation of Step S04 and the detection step of Step S05 can be automated, all the ceramic bodies 111 within the multi-layer sheet 104 can be subjected to the inspection for the amounts of deviation of the internal electrodes. With this configuration, a detective product can be certainly detected. Moreover, the information processing device can analyze the amount of deviation within the multi-layer sheet 104 or a distribution of detective products on the basis of the inspection results of the respective ceramic bodies 111. Therefore, more detailed feedback on the lamination step of Step S02 and the cutting step of Step S03 can be performed, and the yield rate can be enhanced.

In addition to the above, since the unsintered ceramic body 111 includes the side margins 118 and the end margins 119a and 119b, when the unsintered ceramic body 111 is determined as being good in Step 505, the unsintered ceramic body 111 can be sintered and then put into production. Therefore, it is unnecessary to discard the ceramic bodies 111 used in the inspection, and it is possible to further enhance the yield rate.

II Second Embodiment

The tapered portion is not limited to the embodiment in which the width direction along the Y-axis direction gradually decreases from one main electrode toward the other main electrode.

For example, as will be described below, the tapered portion may include a constricted portion between the pair of main electrodes, the constricted portion having the smallest width dimension along the Y-axis direction.

It should be noted that hereinafter the configurations similar to those in the first embodiment will be denoted by the same reference symbols, and description thereof will be omitted.

Figures 19A, 19B:
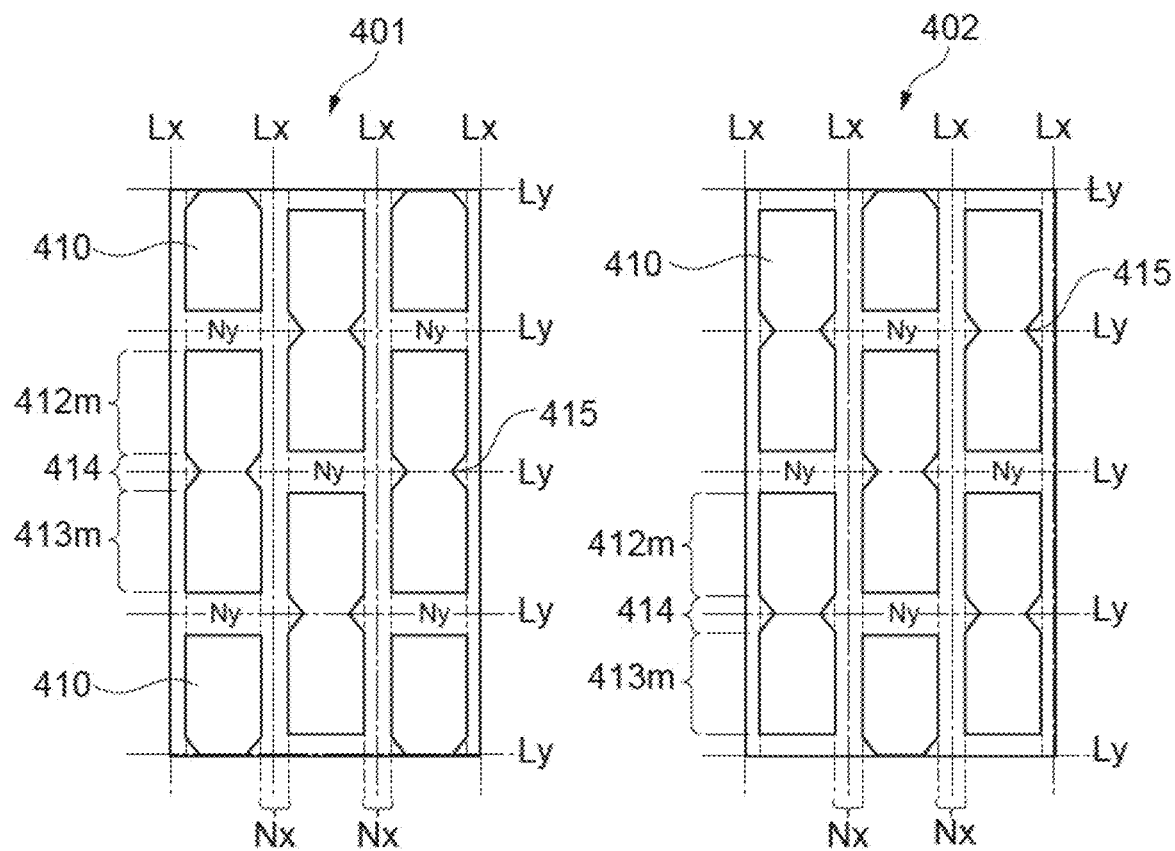
FIGS. 19A and 19B are each a plan view showing a production process of a multi-layer ceramic capacitor according to a second embodiment of the present disclosure.

FIGS. 19A and 19B are plan views of ceramic sheets 401 and 402, respectively, according to a second embodiment.

As shown in FIGS. 19A and 19B, internal electrode patterns 410 are arrayed along the X-axis direction and the Y-axis direction as in the case of the internal electrode patterns 110 of the first ceramic sheets 101 and the second ceramic sheets 102 according to the first embodiment. The internal electrode pattern 410 includes a pair of main electrodes 412m and 413m and a tapered portion 414 as in the case of the internal electrode pattern 110.

The tapered portion 414 includes a constricted portion 415 that connects the pair of main electrodes 412m and 413m to each other and has the smallest width dimension along the Y-axis direction between the main electrodes 412m and 413m. In other words, the tapered portion 414 includes a portion whose width dimension in the Y-axis direction gradually decreases from the main electrode 412m toward the constricted portion 415 and a portion whose width dimension in the Y-axis direction gradually increases from the constricted portion 415 toward the main electrode 413m. Also in this embodiment, the tapered portion 414 functions as a narrow width portion that connects the main electrode 412m and the main electrode 413m to each other and has a width dimension in the Y-axis direction that changes along the X-axis direction.

The constricted portion 415 may be formed on the design cutting line Ly. With this configuration, the tapered portion 414 can be formed to be linearly symmetrical with a straight line, which is parallel to the Y-axis direction and passes on the constricted portion 415, and the detection of the amounts of deviation δx of internal electrodes 412 and 413 in the X-axis direction is facilitated as will be described later.

Figure 20:
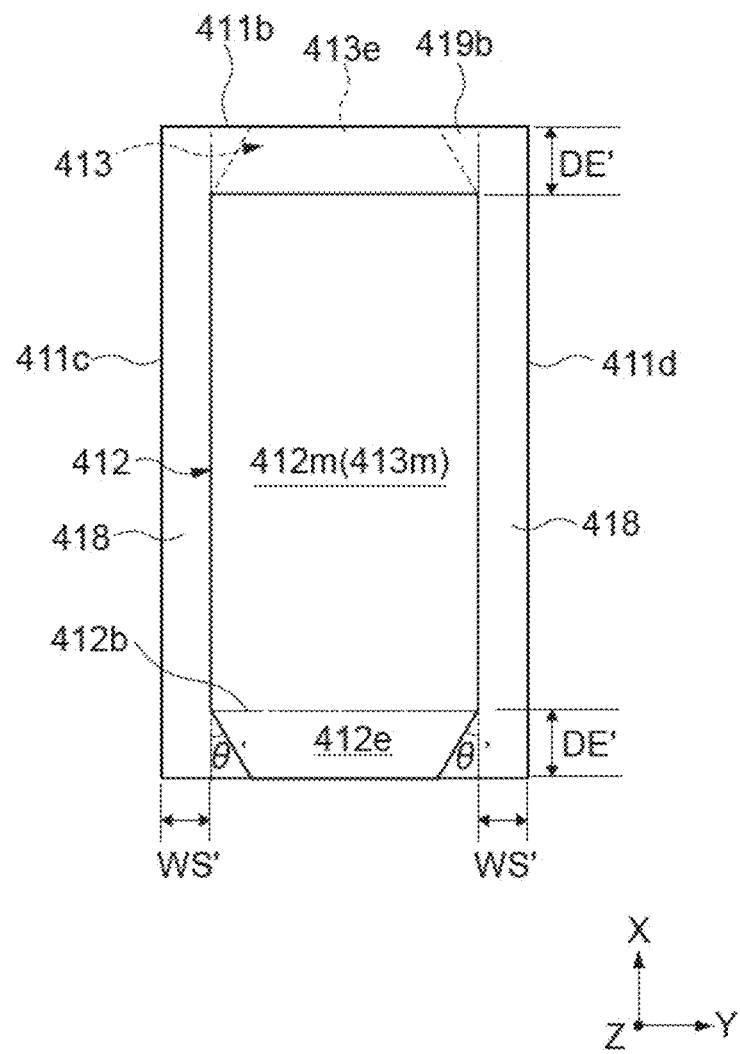
FIG. 20 is a cross-sectional view showing a production process of the multi-layer ceramic capacitor.

As shown in FIG. 20, when the cutting is performed along the design cutting lines Lx and Ly, the internal electrodes 412 and 413 formed by cutting the internal electrode pattern 410 are each disposed at a design position, which is the center portion of a ceramic body 411. In other words, a dimension of each of a pair of side margins 418 along the Y-axis direction has a width dimension WS' as a design value. Further, a dimension of each of a drawn portion 412e and an end margin 419a along the X-axis direction, and a dimension of each of a drawn portion 413e and an end margin 419b along the X-axis direction also have a length dimension DE' as a design value.

Figure 21:
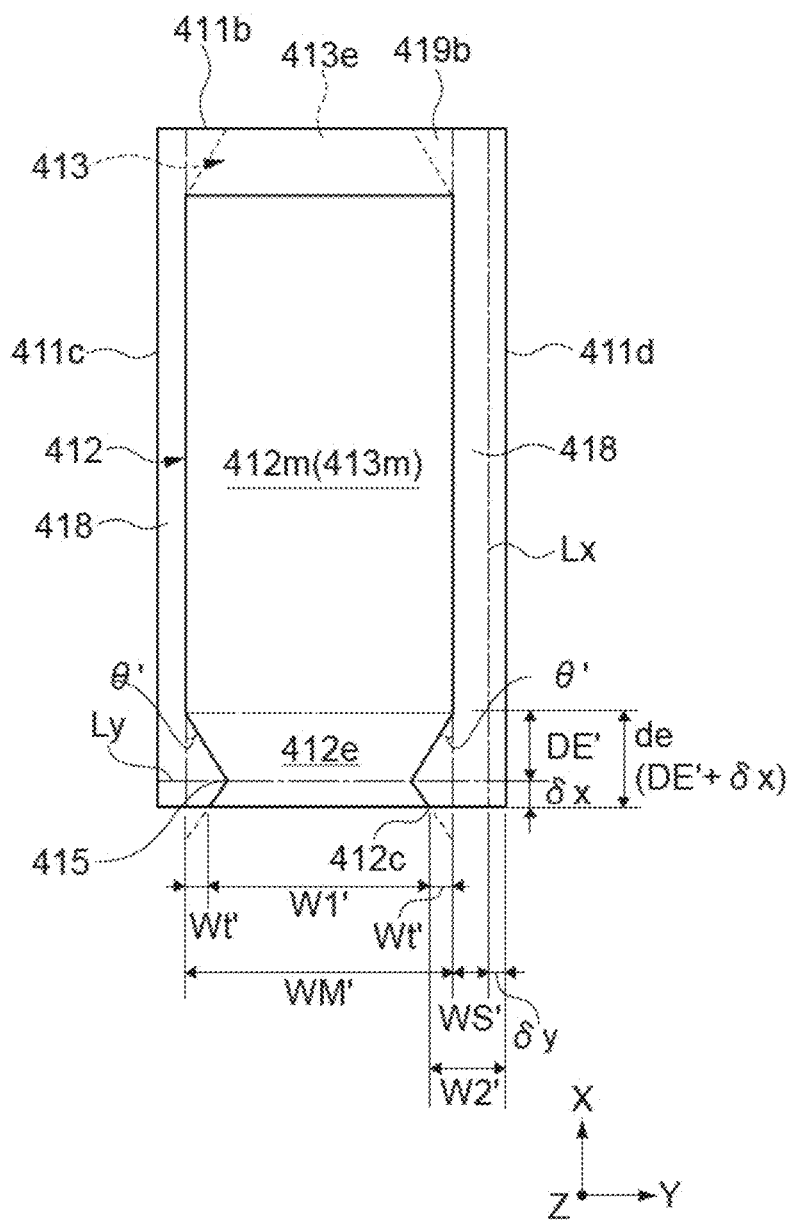
FIG. 21 is a cross-sectional view showing a production process of the multi-layer ceramic capacitor.

Meanwhile, as shown in FIG. 21, when the internal electrode 412 or 413 is deviated from the design position by δx in the X-axis direction and by δy in the Y-axis direction, the amounts of deviation δx and δy can be detected as in the case of the first embodiment.

In other words, the amount of deviation δx along the X-axis direction from the design position of the internal electrode 412 or 413 can be detected on the basis of a width dimension w1' of the drawn portion 412e along the Y-axis direction, the drawn portion 412e being exposed from an end surface 411a. A length dimension de' of the end margin 419a is calculated on the basis of Expression (4) described in the first embodiment. Specifically, it is assumed that the angle defined by the end margin 419a and the tapered portion 414 (drawn portion 412e) is θ'. The amount of deviation δx is expressed by Expression (4)' on the basis of the angle θ', a design width dimension WM' of a boundary 412b, a design length dimension DE' of an end margin 219a, and the measured width dimension w1'.

$$\delta x = \{(WM' - w1')/2 \tan \theta'\} - DE' \qquad (4)'$$

Further, the amount of deviation δy along the Y-axis direction from the design position of the internal electrode 412 or 413 can be detected on the basis of a width dimension w2' along the Y-axis direction from an end portion 412c of the drawn portion 412e in the Y-axis direction to a side surface 411d. In other words, a width dimension ws' of a side margin 418 is calculated from the measured width dimension w2', and a difference between a design value of the width dimension WS' of the side margin 418 and the actual width dimension ws' is calculated. In other words, the amount of deviation δy can be expressed by Expression (6)' conforming to Expression (6) of the first embodiment.

$$\delta y = w2' - (WM' - w1')/2 - WS' \qquad (6)'$$

As described above, also in this embodiment, when at least one of the end surface 411a or 411b is inspected, the amounts of deviation of the internal electrodes 412 and 413 from the design positions can be detected. Therefore, the step of detecting the amount of deviation of Step S04 and the detection step of Step S05 can be automated, and more detailed feedback on the lamination step of Step S02 and the cutting step of Step S03 can be performed. Further, the ceramic body 411 determined as being good can be put into production after the sintering step of Step S05 and the step of forming external electrodes of Step S06, and the yield rate can be enhanced. Moreover, even if the multi-layer ceramic capacitor is miniaturized, the deviation of the internal electrode can be detected easily and accurately. For example, the effect described above can be obtained more effectively when the multi-layer ceramic capacitor of FIG. 1 is a small product whose outer dimensions in the X-axis direction and the Y-axis direction are 0.6 mm and 0.3 mm, respectively, 0.4 mm and 0.2 mm, respectively, or 0.2 mm and 0.1 mm, respectively, as design values. Further, even if the size (outer dimension) of the multi-layer ceramic capacitor in the Z-axis direction that is the lamination direction of the ceramic layers 21 is less than 0.3 mm in FIG. 1, a similar effect can be obtained. It should be noted that the design value of the width dimension w1' of the drawn portion 412e along the Y-axis direction, the drawn portion 412e being exposed from the end surface 411a, is the same as the design value of the width dimension of the opposed drawn portion 413e along the Y-axis direction, the drawn portion 413e being exposed from an end surface 411b.

III Third Embodiment

The narrow width portion that connects the first main electrode and the second main electrode to each other is not limited to have the tapered shape whose width dimension gradually changes along the X-axis direction.

Figure 22:
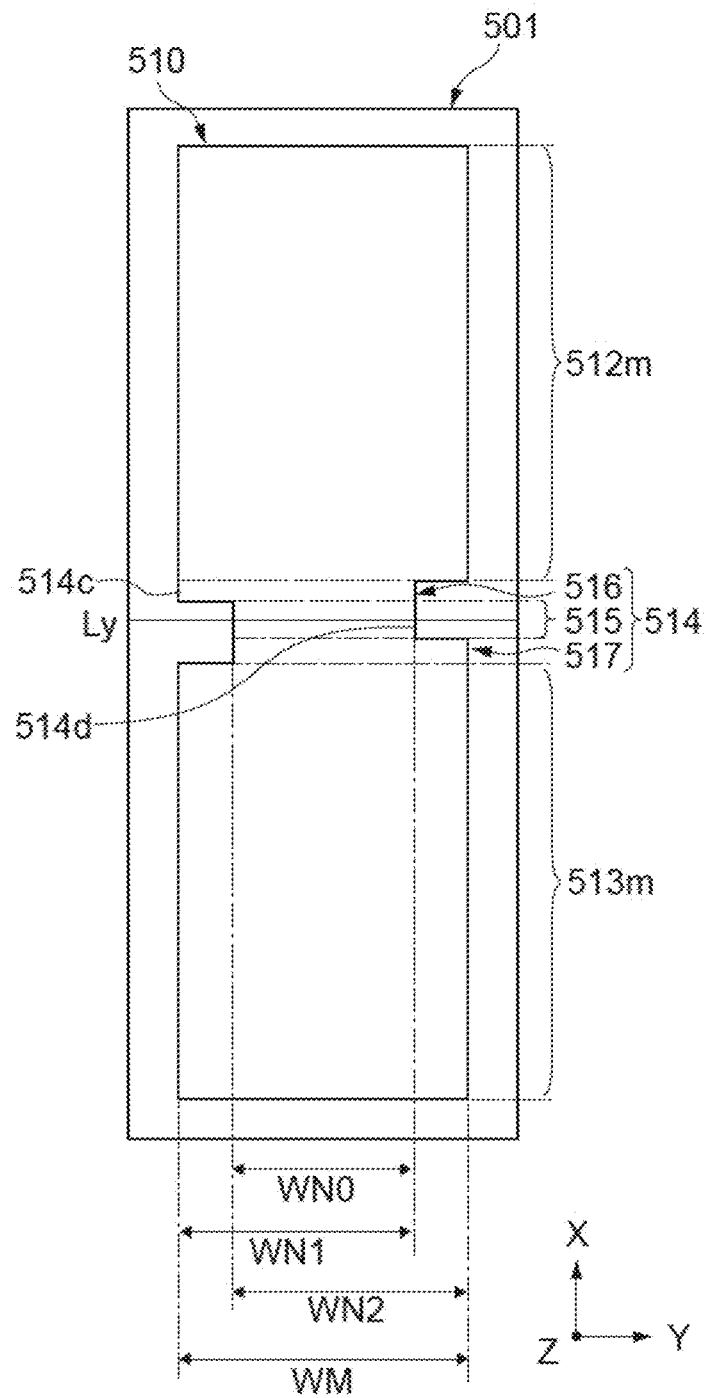
FIG. 22 is a plan view showing a production process of a multi-layer ceramic capacitor according to a third embodiment of the present disclosure.

FIG. 22 is a plan view of a ceramic sheet 501 according to this embodiment. It should be noted that a plurality of internal electrode patterns 510 are arrayed on the ceramic sheet 501 along the X-axis direction and the Y-axis direction, as in the case of the ceramic sheets 101, 102, 401, and 402 of the embodiments described above, but FIG. 22 shows a single internal electrode pattern 510.

As shown in FIG. 22, the internal electrode pattern 510 includes a first main electrode 512m and a second main electrode 513m that face each other in the X-axis direction, and a narrow width portion 514.

The narrow width portion 514 connects the first main electrode 512m and the second main electrode 513m to each other and has a width dimension, which is smaller than that of the first main electrode 512m and the second main electrode 513m in the Y-axis direction and changes along the X-axis direction. The expression "the width dimension changes along the X-axis direction" described herein means that the narrow width portion 514 includes a region in which the width dimension changes in at least a part thereof.

As shown in FIG. 22, the narrow width portion 514 includes a constricted portion 515, a first connection portion 516 that connects the constricted portion 515 and the first main electrode 512m, and a second connection portion 517 that connects the constricted portion 515 and the second main electrode 513m.

The constricted portion 515 is a portion having the smallest width dimension in the narrow width portion 514. The constricted portion 515 of this embodiment is configured such that a first outer edge 514c and a second outer edge 514d that face each other in the X-axis direction extend in the X-axis direction across the design cutting line Ly extending in the Y-axis direction. With this configuration, the constricted portion 515 is configured to have a substantially constant width dimension WN0 along the X-axis direction. The constricted portion 515 is formed within a range where the deviation of a cut position from the cutting line Ly is acceptable in the X-axis direction.

The first connection portion 516 has a configuration in which a portion on the first outer edge 514c side protrudes from the constricted portion 515 to one side in the Y-axis direction, and has a width dimension WN1 that is larger than the width dimension WN0 and smaller than the width dimension WM. More specifically, in the first connection portion 516, the first outer edge 514c includes a portion extending from the constricted portion 515 to one side in the Y-axis direction and a portion extending from the first main electrode 512m linearly in the X-axis direction. Further, the second outer edge 514d extends from the constricted portion 515 linearly in the X-axis direction.

The second connection portion 517 has a configuration in which a portion on the second outer edge 514d side protrudes from the constricted portion 515 to the other side in the Y-axis direction, and has a width dimension WN2 that is larger than the width dimension WN0 and smaller than the width dimension WM. More specifically, in the second connection portion 517, the first outer edge 514c extends from the constricted portion 515 linearly in the X-axis direction. Further, the second outer edge 514d includes a portion extending from the constricted portion 515 to the other side in the Y-axis direction and a portion extending from the second main electrode 513m linearly in the X-axis direction.

In such a manner, in this embodiment, the narrow width portion 514 has a shape that is linearly non-symmetrical with a straight line, which is parallel to the Y-axis direction, and the first outer edge 514c and the second outer edge 514d are formed to be asymmetric and staggered. The ceramic sheets 501 each including such an internal electrode pattern 510 are laminated alternately with other ceramic sheets 501 on each of which the internal electrode pattern 510 is formed with a shift corresponding to one chip in the X-axis direction or the Y-axis direction, as in Steps S01 and S02 described above. Subsequently, as in Step S03 described above, the laminate of the ceramic sheets 501 is cut, and as in Step S04 described above, the amount of deviation and the orientation of the deviation of internal electrodes 512 and 513 are detected.

Figure 23:
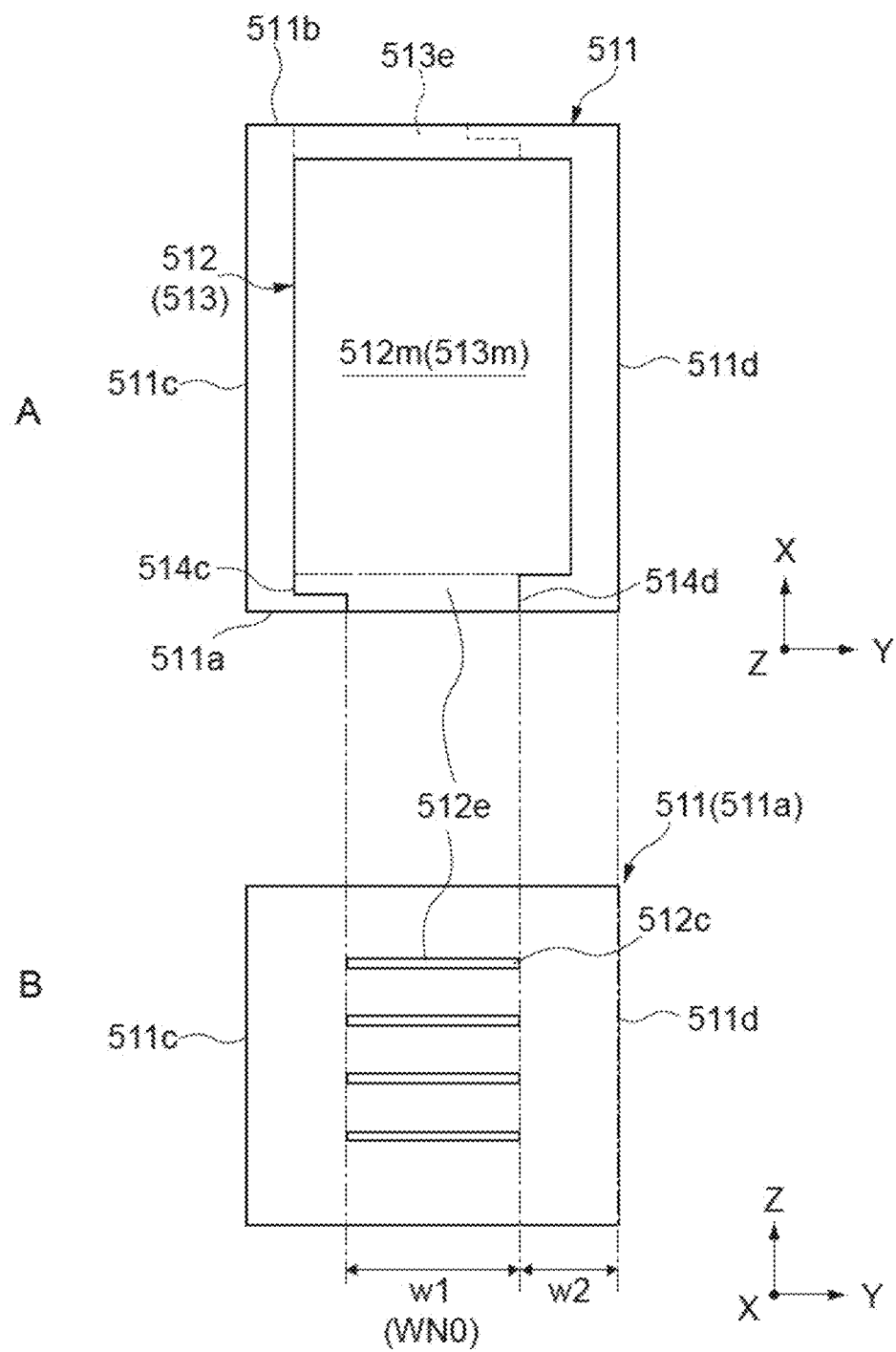
FIG. 23 is a view showing a production process of the multi-layer ceramic capacitor, in which A is a cross-sectional view, and B is a side view.
Figure 24:
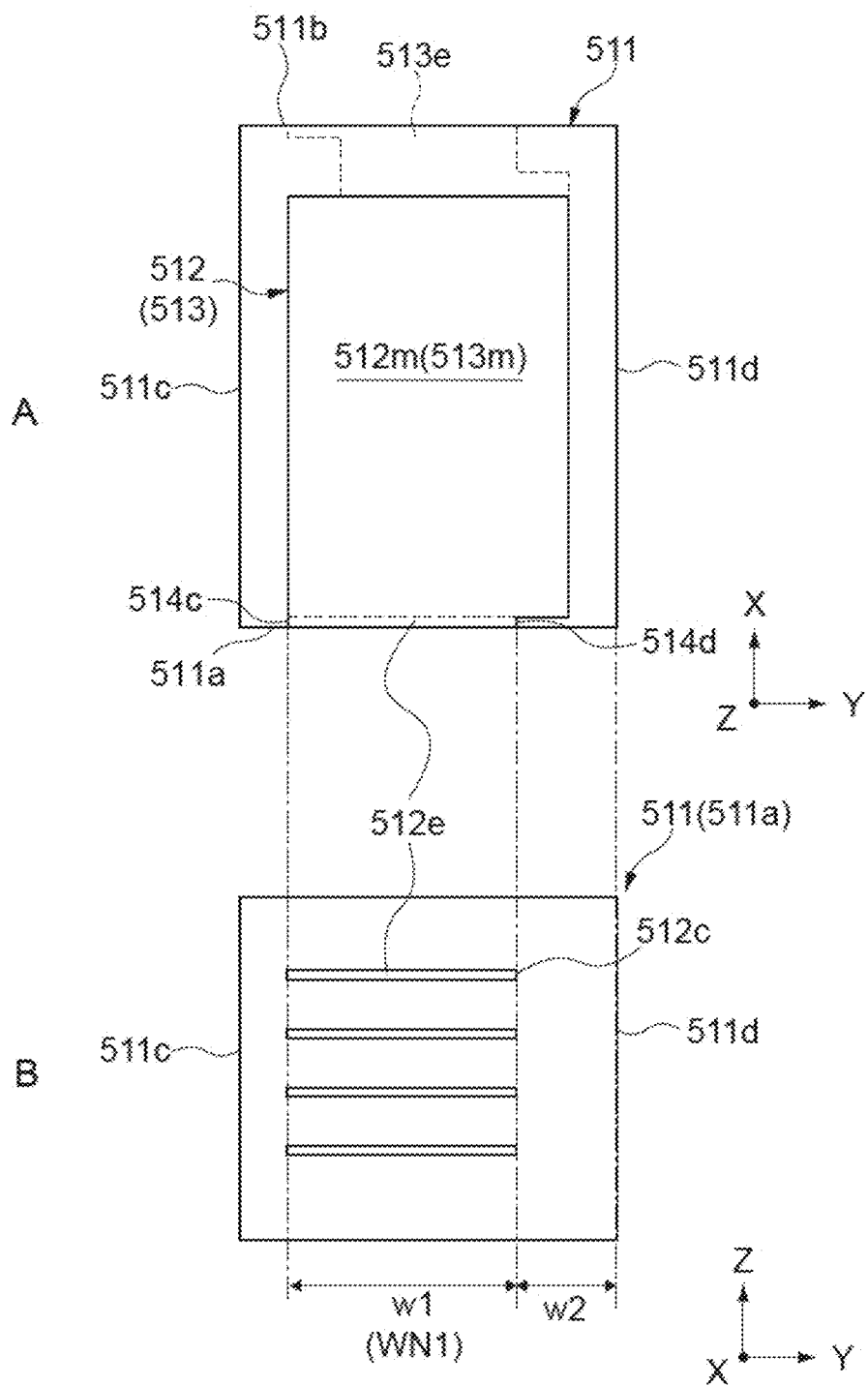
FIG. 24 is a view showing a production process of the multi-layer ceramic capacitor, in which A is a cross-sectional view, and B is a side view.
Figure 25:
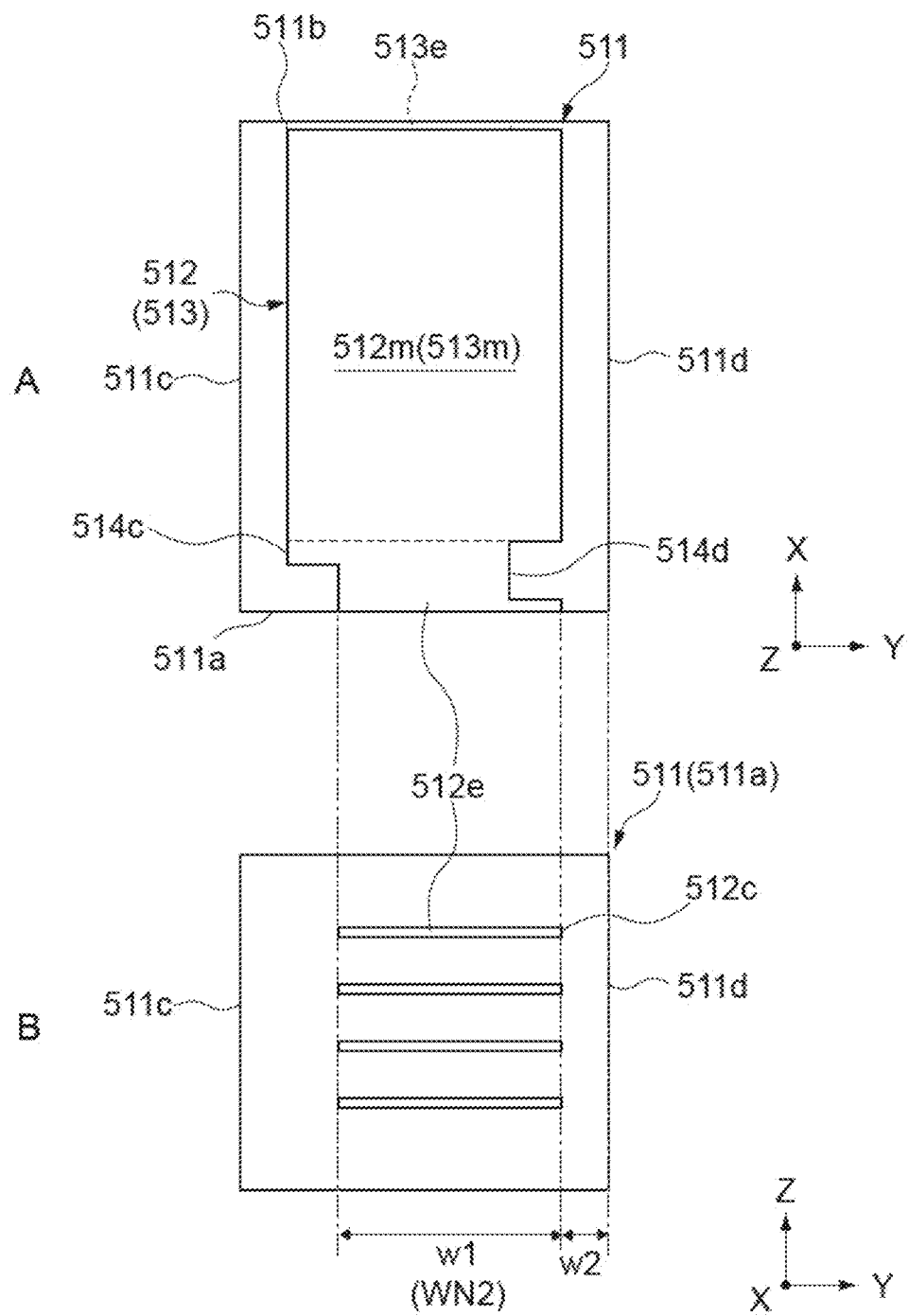
FIG. 25 is a view showing a production process of the multi-layer ceramic capacitor, in which A is a cross-sectional view, and B is a side view.

FIGS. 23 to 25 are views each showing a ceramic body 511 that is produced by cutting the laminate of the ceramic sheets 501 including the internal electrode patterns 510. In each figure, A is a cross-sectional view cut along the X-Y plane, and B is a side view showing an end surface 511a. It should be noted that hatching is omitted in the cross-sectional view of A.

FIG. 23 shows a configuration example in which a multi-layer sheet is cut within the constricted portion 515 along the Y-axis direction. It should be noted that an end surface 511b in this case is configured in a similar manner as shown in B of FIG. 23, and description thereof will thus be omitted.

In FIG. 23, a drawn portion 512e in which the narrow width portion 514 is cut has a width dimension WN0 in the Y-axis direction on the end surface 511a. In other words, when the end surface 511a is subjected to a visual inspection in Step S04 described above, if the width dimension w1 of the drawn portion 512e along the Y-axis direction substantially coincides with the width dimension WN0, it can be determined that the amounts of deviation of the internal electrodes 512 and 513 from the design position in the X-axis direction falls within the proper range and the ceramic body 511 is good.

FIG. 24 shows a case where a multi-layer sheet is cut within the first connection portion 516 along the Y-axis direction. It should be noted that the end surface 511b in this case is configured in a similar manner as shown in B of FIG. 25, and description thereof will thus be omitted.

In this case, in the visual inspection of Step S04 described above, it is detected that the width dimension w1 of the drawn portion 512e along the Y-axis direction is larger than the width dimension WN0 and smaller than the width dimension WM and, for example, coincides with the width dimension WN1. With this configuration, in the determination of quality in Step S05 described above, it can be determined the amounts of deviation of the internal electrodes 512 and 513 from the design position in the X-axis direction exceeds the proper range and the ceramic body 511 is detective.

In addition, in the visual inspection of Step S04 described above, it can be detected that the drawn portion 512e exposed from the end surface 511a deviates to the side surface 511c side, on the basis of the width dimension w2 along the Y-axis direction from an end portion 512c of the drawn portion 512e in the Y-axis direction to the side surface 511d. With this configuration, it can be detected that the ceramic body 511 is cut within the first connection portion 516 whose portion on the first outer edge 514c side protrudes, and the cut position deviates to the first main electrode 512m side. Therefore, in the step of adjusting the position of the internal electrode in Step S03' described above, the cut position can be accurately adjusted.

FIG. 25 shows a case where a multi-layer sheet is cut within the second connection portion 517 along the Y-axis direction. It should be noted that the end surface 511b in this case is configured in a similar manner as shown in B of FIG. 24, and description thereof will thus be omitted.

Also in FIG. 25, as in the case show in FIG. 24, in the visual inspection of Step S04 described above, it is detected that the width dimension w1 of the drawn portion 512e along the Y-axis direction is larger than the width dimension WN0 and smaller than the width dimension WM and, for example, coincides with the width dimension WN2. With this configuration, in the determination of quality in Step S05 described above, the amounts of deviation of the internal electrodes 512 and 513 from the design position in the X-axis direction exceeds the proper range and the ceramic body 511 is detective. Further, in Step S04, it can be detected that the drawn portion 512e exposed from the end surface 511a deviates to the side surface 511d side, and the cut position deviates to the second main electrode 513m side. With this configuration, in the step of adjusting the position of the internal electrode in Step S03' described above, the cut position can be accurately adjusted.

It should be noted that the amounts of deviation of the internal electrodes 512 and 513 in the Y-axis direction can be determined on the basis of the size of the width dimension w2 in consideration of the cut position in the drawn portion 512e depending on the size of the width dimension w1.

With this configuration, as in the first embodiment, performing a visual inspection on one end surface enables the determination on a proper cut position and the orientation of deviation thereof. Moreover, a part of the narrow width portion 514 has a constant width dimension, which can suppress narrowing of the width dimension in the narrow width portion 514. Therefore, even if the size of the multi-layer ceramic capacitor is reduced, the deviation of the internal electrode can be detected easily and accurately. For example, the effect described above can be obtained more effectively when the multi-layer ceramic capacitor of FIG. 1 is a small product whose outer dimensions in the X-axis direction and the Y-axis direction are 0.6 mm and 0.3 mm, respectively, 0.4 mm and 0.2 mm, respectively, or 0.2 mm and 0.1 mm, respectively, as design values. Further, even if the size (outer dimension) of the multi-layer ceramic capacitor in the Z-axis direction that is the lamination direction of the ceramic layers 21 is less than 0.3 mm in FIG. 1, a similar effect can be obtained.

IV Fourth Embodiment

Figure 26:
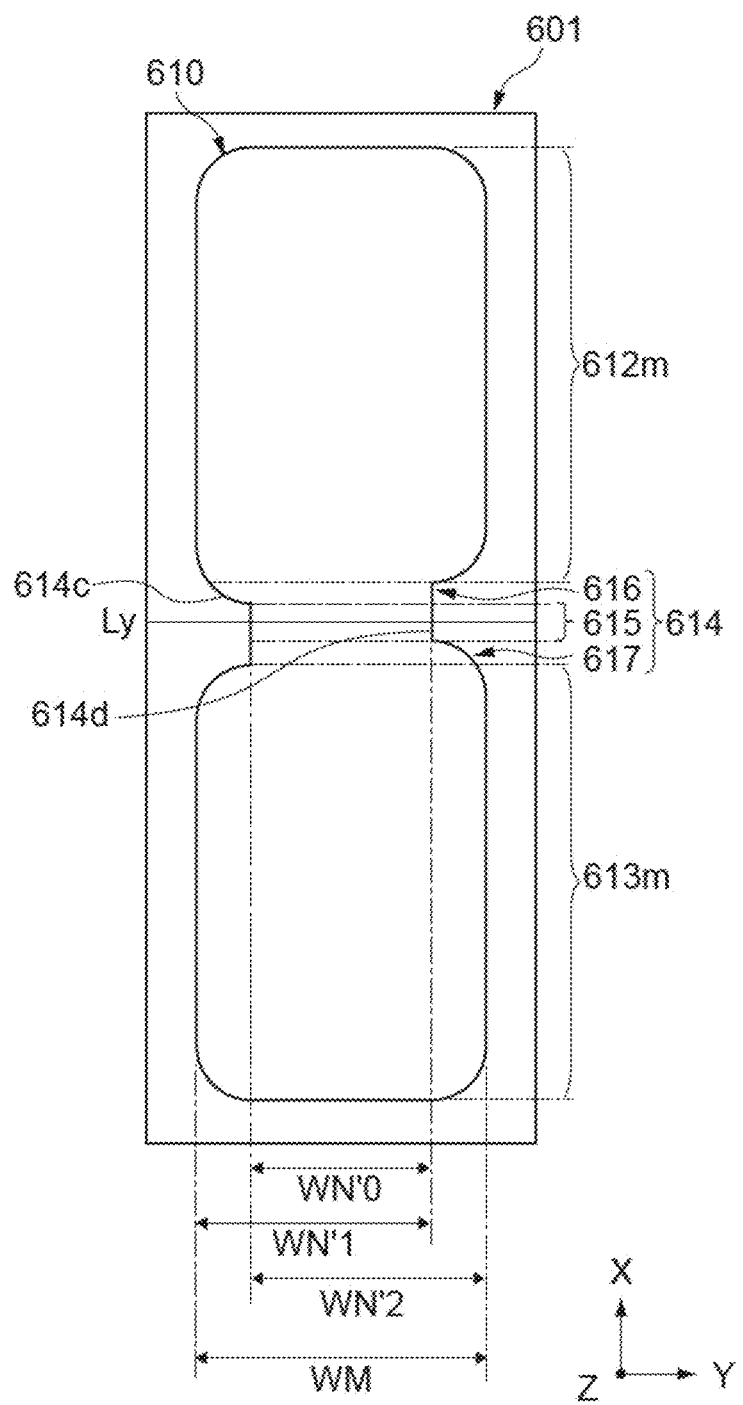
FIG. 26 is a plan view showing a production process of a multi-layer ceramic capacitor according to a fourth embodiment of the present disclosure.

FIG. 26 is a plan view of a ceramic sheet 601 according to a fourth embodiment of the present disclosure.

As shown in FIG. 26, an internal electrode pattern 610 may be formed to have rounded corners on the basis of the internal electrode pattern 510. In other words, the internal electrode pattern 610 includes a first main electrode 612m and a second main electrode 613m that face each other in the X-axis direction, and a narrow width portion 614 as with the case of the internal electrode pattern 510. The narrow width portion 614 can be defined as a region, in which the width dimension is narrower than the width dimensions of the first main electrode 612m and the second main electrode 613m in the Y-axis direction and changes along the X-axis direction on one side or the other side in the Y-axis direction, and at least one of the first outer edge 614c or the second outer edge 614d has a linear shape.

As with the case of the constricted portion 515, a constricted portion 615 is configured such that the first outer edge 614c and the second outer edge 614d that face each other in the Y-axis direction extend in the X-axis direction across the design cutting line Ly. The constricted portion 615 is a portion having the smallest width dimension in the narrow width portion 614 and is configured to have a constant width dimension WN'0 along the X-axis direction.

As with the case of the first connection portion 516, a first connection portion 616 has a configuration in which a portion on the first outer edge 614c side protrudes from the constricted portion 615 to one side in the Y-axis direction, and has a width dimension WN'1 that is larger than the width dimension WN'0 and smaller than the width dimension WM.

As with the case of the second connection portion 517, a second connection portion 617 has a configuration in which a portion on the second outer edge 614d side protrudes from the constricted portion 615 to the other side in the Y-axis direction, and has a width dimension WN2 that is larger than the width dimension WN'0 and smaller than the width dimension WM.

With this configuration, when the laminate of the ceramic sheets 601 is cut to produce a ceramic body, as in the third embodiment, performing a visual inspection of Step S04 on an end surface facing in the X-axis direction enables the amount of deviation of the internal electrode and the orientation of deviation thereof to be determined. In other words, narrowing of the width dimension in the narrow width portion 614 can be suppressed, and the deviation of the internal electrode can be detected easily and accurately. For example, the effect described above can be obtained more effectively when the multi-layer ceramic capacitor of FIG. 1 is a small product whose outer dimensions in the X-axis direction and the Y-axis direction are 0.6 mm and 0.3 mm, respectively, 0.4 mm and 0.2 mm, respectively, or 0.2 mm and 0.1 mm, respectively, as design values. Further, even if the size (outer dimension) of the multi-layer ceramic capacitor in the Z-axis direction that is the lamination direction of the ceramic layers 21 is less than 0.3 mm in FIG. 1, a similar effect can be obtained.

V Other Embodiments

Hereinabobve, the embodiments of the present disclosure have been described, but the present disclosure is not limited to the embodiments described above, and it should be appreciated that the present disclosure may be variously modified without departing from the gist of the present disclosure as a matter of course. For example, the embodiments of the present disclosure may be an embodiment as a combination of the embodiments.

The tapered portion is not limited to have a configuration linearly symmetrical with a straight line parallel to the X-axis direction. Further, the tapered portion may include a curved line. Moreover, when the tapered portion includes a constricted portion, the tapered portion does not need to be linearly symmetrical with a straight line parallel to the Y-axis direction and to include the constricted portion on the cutting line.

Further, the step of adjusting the position of the internal electrode in Step S03' is not limited to adjust the cut position, and the lamination positions of the first ceramic sheets 101 and the second ceramic sheets 102 in Step S02 may be adjusted on the basis of the amount of deviation of the internal electrode, which is detected in Step S04. According to the present disclosure, the width dimensions w1 and w2 (w1' and w2') on one end surface are measured, so that the deviation of the internal electrode can be detected. Accordingly, the width dimensions w1 and w2 of the drawn portion at different positions in the Z-axis direction are measured, and thus the change in the amount of deviation of the internal electrode along the Z-axis direction can also be easily detected.

In other words, in the step of adjusting the position of the internal electrode in Step S03', at least one of the lamination position or the cut position can be adjusted.

For example, in the embodiments described above, the multi-layer ceramic capacitor 10 has been described as an example of a multi-layer ceramic electronic component, but the present disclosure can be applied to general multi-layer ceramic electronic components. Examples of such multi-layer ceramic electronic components include a chip varistor, a chip thermistor, and a multi-layer inductor.

What is claimed is:

1. A multi-layer ceramic electronic component, comprising:
   first internal electrodes each including
      a first main electrode, and
      a first drawn portion extending from the first main electrode to a first end surface facing in a first direction; and
   second internal electrodes each including
      a second main electrode, and
      a second drawn portion extending from the second main electrode to a second end surface facing the first end surface in the first direction, the second internal electrodes being laminated alternately with the first internal electrodes,
   the first drawn portion formed to have a width dimension along a second direction that decreases toward the first end surface and to have a predetermined width dimension in the first end surface, the second direction being orthogonal to the first direction,
   the second drawn portion formed to have a width dimension along the second direction that increases toward the second end surface and to have the predetermined width dimension in the second end surface.

2. The multi-layer ceramic electronic component according to claim 1, wherein
   the multi-layer ceramic electronic component has
      an outer dimension in the first direction of 0.6 mm as a design value, and
      an outer dimension in the second direction of 0.3 mm as a design value.

3. The multi-layer ceramic electronic component according to claim 1, wherein
   the multi-layer ceramic electronic component has
      an outer dimension in the first direction of 0.4 mm as a design value, and
      an outer dimension in the second direction of 0.2 mm as a design value.

4. The multi-layer ceramic electronic component according to claim 1, wherein
   the multi-layer ceramic electronic component has
      an outer dimension in the first direction of 0.2 mm as a design value, and
      an outer dimension in the second direction of 0.1 mm as a design value.

5. The multi-layer ceramic electronic component according to claim 1, wherein
   the multi-layer ceramic electronic component has an outer dimension in a third direction that is less than 0.3 mm, the third direction being orthogonal to the first direction and the second direction.

6. A multi-layer ceramic electronic component, comprising:
   first internal electrodes each including
      a first main electrode, and
      a first drawn portion extending from the first main electrode to a first end surface facing in a first direction; and
   second internal electrodes each including
      a second main electrode, and
      a second drawn portion extending from the second main electrode to a second end surface facing the first end surface in the first direction, the second internal electrodes being laminated alternately with the first internal electrodes,
   the first drawn portion including
      a constricted portion having a smallest width dimension along the second direction, and
      a portion having a width dimension that decreases from the first main electrode toward the constricted portion and a portion having a width dimension that increases from the constricted portion toward the first end surface,
   the second drawn portion formed to have a width dimension along the second direction that decreases toward the second end surface and to have the same width dimension in the second end surface as a width dimension of the first drawn portion in the first end surface.

7. The multi-layer ceramic electronic component according to claim 6, wherein
   the multi-layer ceramic electronic component has
      an outer dimension in the first direction of 0.6 mm as a design value, and
      an outer dimension in the second direction of 0.3 mm as a design value.

8. The multi-layer ceramic electronic component according to claim 6, wherein
   the multi-layer ceramic electronic component has
      an outer dimension in the first direction of 0.4 mm as a design value, and
      an outer dimension in the second direction of 0.2 mm as a design value.

9. The multi-layer ceramic electronic component according to claim 6, wherein
   the multi-layer ceramic electronic component has
      an outer dimension in the first direction of 0.2 mm as a design value, and
      an outer dimension in the second direction of 0.1 mm as a design value.

10. The multi-layer ceramic electronic component according to claim 6, wherein
    the multi-layer ceramic electronic component has an outer dimension in a third direction that is less than 0.3 mm, the third direction being orthogonal to the first direction and the second direction.

11. A multi-layer ceramic electronic component, comprising:
    first internal electrodes each including
       a first main electrode, and
       a first drawn portion extending from the first main electrode to a first end surface facing in a first direction; and
    second internal electrodes each including
       a second main electrode, and
       a second drawn portion extending from the second main electrode to a second end surface facing the first end surface in the first direction, the second internal electrodes being laminated alternately with the first internal electrodes,
    the first drawn portion formed to have a width dimension along a second direction that increases on one side in the second direction toward the first main electrode and to have a predetermined width dimension in the first end surface, the second direction being orthogonal to the first direction, the second drawn portion formed to have a width dimension along the second direction that increases on another side in the second direction toward the second end surface and to have the predetermined width dimension in the second end surface.

12. The multi-layer ceramic electronic component according to claim 11, wherein the multi-layer ceramic electronic component has an outer dimension in the first direction of 0.6 mm as a design value, and an outer dimension in the second direction of 0.3 mm as a design value.

13. The multi-layer ceramic electronic component according to claim 11, wherein the multi-layer ceramic electronic component has an outer dimension in the first direction of 0.4 mm as a design value, and an outer dimension in the second direction of 0.2 mm as a design value.

14. The multi-layer ceramic electronic component according to claim 11, wherein the multi-layer ceramic electronic component has an outer dimension in the first direction of 0.2 mm as a design value, and an outer dimension in the second direction of 0.1 mm as a design value.

15. The multi-layer ceramic electronic component according to claim 11, wherein the multi-layer ceramic electronic component has an outer dimension in a third direction that is less than 0.3 mm, the third direction being orthogonal to the first direction and the second direction.

* * * * *